(12) United States Patent
Chen et al.

(10) Patent No.: US 8,468,515 B2
(45) Date of Patent: Jun. 18, 2013

(54) INITIALIZATION AND UPDATE OF SOFTWARE AND/OR FIRMWARE IN ELECTRONIC DEVICES

(75) Inventors: Shao-Chun Chen, Aliso Viejo, CA (US); Patrick O'Neill, Dana Point, CA (US); Peter L. Sotos, Orange, CA (US); Jeong M. Lim, Seoul (KR); Sidney Andrew Jacobi, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1293 days.

(21) Appl. No.: 11/637,550

(22) Filed: Dec. 12, 2006

(65) Prior Publication Data

US 2007/0089108 A1    Apr. 19, 2007

Related U.S. Application Data

(63) Continuation of application No. 10/411,784, filed on Apr. 11, 2003, which is a continuation-in-part of application No. 10/311,462, filed as application No. PCT/US01/44034 on Nov. 19, 2001.

(60) Provisional application No. 60/373,422, filed on Apr. 12, 2002, provisional application No. 60/373,421, filed on Apr. 12, 2002, provisional application No. 60/373,423, filed on Apr. 12, 2002, provisional application No. 60/372,066, filed on Apr. 12, 2002, provisional application No. 60/249,606, filed on Nov. 17, 2000.

(51) Int. Cl.
*G06F 9/44* (2006.01)
*G06F 9/00* (2006.01)

(52) U.S. Cl.
USPC ............................... 717/170; 713/1; 713/100

(58) Field of Classification Search
USPC .......................................................... 717/170
See application file for complete search history.

(56) References Cited

U.S. PATENT DOCUMENTS

| 4,337,376 A | 6/1982 | Gruenberg |
| 4,344,091 A | 8/1982 | Gardner et al. |
| 4,429,387 A | 1/1984 | Kaminski |

(Continued)

FOREIGN PATENT DOCUMENTS

| CA | 2339923 | 3/2000 |
| CA | 2414281 | 5/2002 |

(Continued)

OTHER PUBLICATIONS

Sevanto et al, "Introducing quality-of-service and traffic classes into wireless mobile networks" 1998, ACM, Proc. of 1st ACM Intl. Wkshp on Wireless Mobile Multimedia, WOWMOM '98, pp. 21-29.*

(Continued)

*Primary Examiner* — James D Rutten

(57) ABSTRACT

A system and method to effectively and efficiently update a version of firmware resident in a device memory is provided. A method of identifying one or more versions of firmware is provided by way of initializing a device memory with a known pattern. In addition, the amount of free unused memory space may be identified and calculated in a device memory. The system and method generates software update packages that are minimal in size providing cost benefit to a manufacturer and convenience to a user.

21 Claims, 13 Drawing Sheets

U.S. PATENT DOCUMENTS

| | | |
|---|---|---|
| 4,493,083 A | 1/1985 | Kinoshita |
| 4,783,841 A | 11/1988 | Crayson |
| 4,807,182 A | 2/1989 | Queen |
| 4,809,170 A | 2/1989 | Leblang et al. |
| 5,084,816 A | 1/1992 | Boese et al. |
| 5,155,847 A | 10/1992 | Kirouac et al. |
| 5,204,960 A | 4/1993 | Smith et al. |
| 5,261,055 A | 11/1993 | Moran et al. |
| 5,274,823 A | 12/1993 | Brenner et al. |
| 5,325,531 A | 6/1994 | McKeeman et al. |
| 5,392,353 A | 2/1995 | Morales |
| 5,410,703 A | 4/1995 | Nilsson et al. |
| 5,418,837 A | 5/1995 | Johannson et al. |
| 5,420,616 A | 5/1995 | Suemitsu et al. |
| 5,421,006 A | 5/1995 | Jablon et al. |
| 5,442,771 A | 8/1995 | Filepp et al. |
| 5,444,765 A | 8/1995 | Marui et al. |
| 5,450,589 A | 9/1995 | Maebayashi et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,563,931 A | 10/1996 | Bishop et al. |
| 5,579,522 A | 11/1996 | Christeson et al. |
| 5,586,328 A | 12/1996 | Caron et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,649,112 A | 7/1997 | Yeager et al. |
| 5,649,200 A | 7/1997 | Leblang et al. |
| 5,666,293 A | 9/1997 | Metz et al. |
| 5,675,628 A | 10/1997 | Hokkanen |
| 5,677,708 A | 10/1997 | Matthews, III |
| 5,689,712 A | 11/1997 | Heisch |
| 5,704,031 A | 12/1997 | Mikami et al. |
| 5,708,709 A | 1/1998 | Rose |
| 5,715,462 A | 2/1998 | Iwamoto et al. |
| 5,717,737 A | 2/1998 | Doviak et al. |
| 5,721,824 A | 2/1998 | Taylor |
| 5,724,526 A | 3/1998 | Kunita |
| 5,727,202 A | 3/1998 | Kucala |
| 5,729,735 A | 3/1998 | Meyering |
| 5,752,039 A | 5/1998 | Tanimura |
| 5,752,042 A | 5/1998 | Cole et al. |
| 5,764,658 A | 6/1998 | Sekiguchi et al. |
| 5,774,715 A | 6/1998 | Madany et al. |
| 5,778,440 A | 7/1998 | Yiu et al. |
| 5,781,921 A | 7/1998 | Nichols |
| 5,790,860 A | 8/1998 | Wetmore et al. |
| 5,790,974 A | 8/1998 | Tognazzini |
| 5,794,254 A | 8/1998 | McClain |
| 5,802,554 A | 9/1998 | Caceres et al. |
| 5,805,899 A | 9/1998 | Evans et al. |
| 5,809,251 A | 9/1998 | May et al. |
| 5,815,722 A | 9/1998 | Kalwitz et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A | 11/1998 | Staelin |
| 5,838,981 A | 11/1998 | Gotoh |
| 5,845,077 A | 12/1998 | Fawcett |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,896,566 A | 4/1999 | Averbuch et al. |
| 5,901,310 A | 5/1999 | Rahman et al. |
| 5,901,330 A | 5/1999 | Sun et al. |
| 5,913,027 A * | 6/1999 | Matsuda et al. .............. 709/201 |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,937,019 A | 8/1999 | Padovani |
| 5,943,406 A | 8/1999 | Leta et al. |
| 5,944,839 A | 8/1999 | Isenberg |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,974,179 A | 10/1999 | Caklovic |
| 5,974,250 A | 10/1999 | Angelo et al. |
| 5,974,454 A | 10/1999 | Apfel et al. |
| 5,987,325 A | 11/1999 | Tayloe |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,415 A | 2/2000 | Cannon et al. |
| 6,021,428 A | 2/2000 | Miloslavsky |
| 6,029,004 A | 2/2000 | Bortnikov et al. |
| 6,031,830 A | 2/2000 | Cowan |
| 6,032,044 A | 2/2000 | Shannon et al. |
| 6,038,636 A | 3/2000 | Brown, III et al. |
| 6,041,333 A | 3/2000 | Bretschneider et al. |
| 6,044,270 A | 3/2000 | Raith |
| 6,044,403 A | 3/2000 | Gerszberg |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |
| 6,058,435 A | 5/2000 | Sassin et al. |
| 6,064,814 A | 5/2000 | Capriles et al. |
| 6,070,012 A | 5/2000 | Eitner et al. |
| 6,070,142 A | 5/2000 | McDonough et al. |
| 6,073,206 A | 6/2000 | Piwonka et al. |
| 6,073,214 A | 6/2000 | Fawcett |
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |
| 6,088,759 A | 7/2000 | Hasbun et al. |
| 6,097,942 A | 8/2000 | Laiho |
| 6,097,966 A | 8/2000 | Hanley |
| 6,105,063 A | 8/2000 | Hayes, Jr. |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A | 9/2000 | Staelin |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoto |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,204 B1 | 3/2001 | Donohue |
| 6,202,207 B1 | 3/2001 | Donohue |

| Patent No. | Date | Inventor |
|---|---|---|
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,659 B1 | 4/2001 | Zehavi |
| 6,230,319 B1 * | 5/2001 | Britt et al. .................... 717/173 |
| 6,233,332 B1 | 5/2001 | Anderson et al. |
| 6,256,497 B1 | 7/2001 | Chambers |
| 6,262,973 B1 | 7/2001 | Shiraishi et al. |
| 6,263,214 B1 | 7/2001 | Yazaki et al. |
| 6,266,809 B1 | 7/2001 | Craig et al. |
| 6,272,333 B1 | 8/2001 | Smith |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,317,872 B1 | 11/2001 | Gee et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,333,980 B1 | 12/2001 | Hollatz et al. |
| 6,334,212 B1 | 12/2001 | Nakajma |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,740 B1 | 4/2002 | Miller et al. |
| 6,381,742 B2 | 4/2002 | Forbes et al. |
| 6,389,464 B1 | 5/2002 | Krishnamurthy et al. |
| 6,393,018 B2 | 5/2002 | Miloslavsky |
| 6,393,585 B1 | 5/2002 | Houha et al. |
| 6,397,385 B1 * | 5/2002 | Kravitz .................... 717/173 |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,418,311 B1 | 7/2002 | Chmaytelli et al. |
| 6,421,776 B1 | 7/2002 | Hillis et al. |
| 6,425,125 B1 | 7/2002 | Fries et al. |
| 6,426,955 B1 | 7/2002 | Gossett Dalton, Jr. et al. |
| 6,438,585 B2 | 8/2002 | Mousseau et al. |
| 6,442,660 B1 | 8/2002 | Henerlau et al. |
| 6,442,754 B1 | 8/2002 | Curtis |
| 6,445,914 B1 | 9/2002 | Findikli et al. |
| 6,446,206 B1 | 9/2002 | Feldbaum |
| 6,449,270 B1 | 9/2002 | Miloslavsky |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 | 10/2002 | Sliger et al. |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,493,871 B1 | 12/2002 | McGuire et al. |
| 6,504,932 B1 | 1/2003 | Vasnier et al. |
| 6,505,228 B1 | 1/2003 | Schoening et al. |
| 6,526,574 B1 | 2/2003 | Jones |
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |
| 6,542,906 B2 | 4/2003 | Korn |
| 6,546,243 B2 | 4/2003 | Tiedemann, Jr. et al. |
| 6,546,492 B1 | 4/2003 | Walker et al. |
| 6,546,552 B1 | 4/2003 | Peleg |
| 6,549,770 B1 | 4/2003 | Marran |
| 6,553,113 B1 | 4/2003 | Dhir et al. |
| 6,556,842 B1 | 4/2003 | Ericsson |
| 6,564,369 B1 | 5/2003 | Hove et al. |
| 6,571,244 B1 | 5/2003 | Larson |
| 6,574,657 B1 | 6/2003 | Dickenson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 | 7/2003 | Schweitz et al. |
| 6,595,856 B1 | 7/2003 | Ginsburg et al. |
| 6,601,153 B1 * | 7/2003 | Engelbrecht et al. ......... 711/166 |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,622,017 B1 | 9/2003 | Hoffman |
| 6,625,451 B1 | 9/2003 | La Medica et al. |
| 6,640,334 B1 | 10/2003 | Rasmussen |
| 6,643,506 B1 | 11/2003 | Criss et al. |
| 6,647,260 B2 | 11/2003 | Dusse et al. |
| 6,651,249 B2 | 11/2003 | Waldin et al. |
| 6,658,090 B1 | 12/2003 | Harjunen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B2 | 12/2003 | Lasser |
| 6,671,265 B1 | 12/2003 | Hwang et al. |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,704,303 B1 | 3/2004 | Bowman-Amuah |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,392 B1 | 4/2004 | Frey et al. |
| 6,728,531 B1 | 4/2004 | Lee et al. |
| 6,728,950 B2 | 4/2004 | Davis et al. |
| 6,730,027 B2 | 5/2004 | Iliff |
| 6,731,932 B1 | 5/2004 | Rune et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,754,181 B1 | 6/2004 | Elliott et al. |
| 6,754,895 B1 | 6/2004 | Bartel et al. |
| 6,754,896 B2 | 6/2004 | Mishra et al. |
| 6,757,263 B1 | 6/2004 | Olds |
| 6,760,730 B1 | 7/2004 | Kataoka |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,779,177 B1 | 8/2004 | Bahrs et al. |
| 6,785,834 B2 | 8/2004 | Chefalas et al. |
| 6,789,215 B1 | 9/2004 | Rupp et al. |
| 6,798,876 B1 | 9/2004 | Bala |
| 6,799,155 B1 | 9/2004 | Lindemann et al. |

| | | |
|---|---|---|
| 6,802,061 B1 | 10/2004 | Parthasarathy et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Chen et al. |
| 6,832,373 B2 | 12/2004 | O'Neill |
| 6,836,657 B2 | 12/2004 | Ji et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,847,970 B2 | 1/2005 | Kar et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,895,387 B1 | 5/2005 | Roberts et al. |
| 6,904,405 B2 | 6/2005 | Suominen |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,941,129 B2 | 9/2005 | Marce et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,966,058 B2 | 11/2005 | Earl et al. |
| 6,968,179 B1 | 11/2005 | De Vries |
| 6,968,543 B2 | 11/2005 | Takahara et al. |
| 6,970,181 B1 | 11/2005 | Fadel |
| 6,970,189 B1 | 11/2005 | Bernstein et al. |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,990,656 B2 | 1/2006 | Ersek et al. |
| 6,990,660 B2 | 1/2006 | Moshir et al. |
| 6,996,603 B1 | 2/2006 | Srinivasan |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,860 B2 | 6/2006 | Miller et al. |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B1 | 7/2006 | Arnaiz et al. |
| 7,080,372 B1 | 7/2006 | Cole |
| 7,086,049 B2 | 8/2006 | Goodman |
| 7,089,036 B2 | 8/2006 | Prise |
| 7,089,549 B2 | 8/2006 | Venkiteswaran |
| 7,096,311 B2 | 8/2006 | Chiang |
| 7,099,896 B2 | 8/2006 | Fields et al. |
| 7,103,172 B2 | 9/2006 | Brown et al. |
| 7,106,843 B1 | 9/2006 | Gainsboro et al. |
| 7,110,525 B1 | 9/2006 | Heller et al. |
| 7,111,201 B2 | 9/2006 | Largman et al. |
| 7,117,172 B1 | 10/2006 | Black |
| 7,117,195 B2 | 10/2006 | Chantrain et al. |
| 7,120,909 B1 | 10/2006 | Shibuya |
| 7,130,896 B2 | 10/2006 | Engel et al. |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,173 B1 | 1/2007 | Herle |
| 7,171,660 B2 | 1/2007 | McCaleb et al. |
| 7,181,731 B2 | 2/2007 | Pace et al. |
| 7,194,728 B1 | 3/2007 | Sirota et al. |
| 7,200,390 B1 | 4/2007 | Henager et al. |
| 7,206,576 B2 | 4/2007 | Jain et al. |
| 7,210,010 B2 | 4/2007 | Ogle |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,356 B2 | 7/2007 | Iki et al. |
| 7,242,929 B2 | 7/2007 | Draluk et al. |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,274,911 B2 | 9/2007 | Li |
| 7,275,243 B2 | 9/2007 | Mittal et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,310,720 B2 | 12/2007 | Cornett |
| 7,313,791 B1 | 12/2007 | Chen et al. |
| 7,324,815 B2 | 1/2008 | Ross et al. |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,405,537 B2 | 7/2008 | Hoffman et al. |
| 7,409,685 B2 | 8/2008 | Chen et al. |
| 7,415,706 B1 | 8/2008 | Raju et al. |
| 7,433,936 B2 | 10/2008 | Zhu et al. |
| 7,461,294 B2 | 12/2008 | Sano |
| 7,469,306 B2 | 12/2008 | Ng |
| 7,493,128 B2 | 2/2009 | Tang et al. |
| 7,500,143 B2 | 3/2009 | Buia et al. |
| 7,509,496 B2 | 3/2009 | Skog et al. |
| 7,509,652 B2 | 3/2009 | Niemi |
| 7,518,504 B2 | 4/2009 | Peeters |
| 7,523,155 B2 | 4/2009 | Hayes, Jr. |
| 7,526,563 B2 | 4/2009 | Ingimundarson et al. |
| 7,555,750 B1 | 6/2009 | Lilley |
| 7,577,722 B1 | 8/2009 | Khandekar et al. |
| 7,584,466 B1 | 9/2009 | Rao |
| 7,657,884 B2 | 2/2010 | Okonnen et al. |
| 7,657,886 B1 | 2/2010 | Chen et al. |
| 7,673,300 B2 | 3/2010 | Herle et al. |
| 7,673,325 B2 | 3/2010 | Vincent et al. |
| 7,680,828 B2 | 3/2010 | Gorelik |
| 7,689,981 B1 | 3/2010 | Gustafson |
| 7,698,698 B2 | 4/2010 | Skan |
| 7,707,570 B2 | 4/2010 | Yoshimura et al. |
| 7,725,889 B2 | 5/2010 | Gustafson et al. |
| 7,739,679 B2 | 6/2010 | Qumei |
| 7,784,065 B2 | 8/2010 | Polivy et al. |
| 7,797,693 B1 | 9/2010 | Gustafson et al. |
| 7,797,695 B2 | 9/2010 | Motta |

| | | |
|---|---|---|
| 7,818,556 B2 | 10/2010 | Lima et al. |
| 7,823,148 B2 | 10/2010 | Deshpande et al. |
| 7,823,155 B2 | 10/2010 | Misra et al. |
| 7,844,964 B2 | 11/2010 | Marolia |
| 7,873,714 B2 | 1/2011 | Kaappa et al. |
| 7,889,869 B2 | 2/2011 | Ypya et al. |
| 8,063,929 B2 | 11/2011 | Kurtz et al. |
| 8,099,078 B2 | 1/2012 | Lazaridis |
| 2001/0008024 A1 | 7/2001 | Inaba |
| 2001/0018673 A1 | 8/2001 | Goldband et al. |
| 2001/0029178 A1 | 10/2001 | Criss et al. |
| 2001/0042112 A1 | 11/2001 | Slivka et al. |
| 2001/0047363 A1 | 11/2001 | Peng |
| 2001/0047441 A1 | 11/2001 | Robertson |
| 2001/0048728 A1 | 12/2001 | Peng |
| 2001/0049263 A1 | 12/2001 | Zhang |
| 2001/0052066 A1* | 12/2001 | Lee et al. ............ 712/248 |
| 2001/0053688 A1 | 12/2001 | Rignell et al. |
| 2001/0055414 A1 | 12/2001 | Thieme |
| 2001/0056348 A1 | 12/2001 | Hyde-Thomson et al. |
| 2002/0010702 A1 | 1/2002 | Ajtai et al. |
| 2002/0023258 A1 | 2/2002 | Elwahab et al. |
| 2002/0030634 A1 | 3/2002 | Noda et al. |
| 2002/0046400 A1 | 4/2002 | Burch |
| 2002/0052938 A1 | 5/2002 | Kanemitsu |
| 2002/0053044 A1 | 5/2002 | Gold et al. |
| 2002/0059526 A1 | 5/2002 | Dillon et al. |
| 2002/0072359 A1 | 6/2002 | Moles et al. |
| 2002/0073304 A1 | 6/2002 | Marsh et al. |
| 2002/0073309 A1 | 6/2002 | Kurn et al. |
| 2002/0075824 A1 | 6/2002 | Willekes |
| 2002/0078142 A1 | 6/2002 | Moore et al. |
| 2002/0078185 A1 | 6/2002 | Swerup et al. |
| 2002/0078209 A1 | 6/2002 | Peng |
| 2002/0085704 A1 | 7/2002 | Shires |
| 2002/0087668 A1 | 7/2002 | San Martin et al. |
| 2002/0090934 A1 | 7/2002 | Mitchelmore |
| 2002/0091568 A1 | 7/2002 | Kraft et al. |
| 2002/0091815 A1 | 7/2002 | Anderson et al. |
| 2002/0092008 A1 | 7/2002 | Kehne et al. |
| 2002/0092010 A1 | 7/2002 | Fiske |
| 2002/0092011 A1* | 7/2002 | Liu et al. ............ 717/169 |
| 2002/0095615 A1 | 7/2002 | Hastings et al. |
| 2002/0099726 A1 | 7/2002 | Crudele et al. |
| 2002/0100028 A1 | 7/2002 | Kosaka et al. |
| 2002/0114384 A1 | 8/2002 | Nelson et al. |
| 2002/0116261 A1 | 8/2002 | Moskowitz et al. |
| 2002/0116665 A1 | 8/2002 | Pickover et al. |
| 2002/0120776 A1 | 8/2002 | Eggebratten et al. |
| 2002/0120810 A1 | 8/2002 | Brouwer |
| 2002/0123335 A1 | 9/2002 | Luna et al. |
| 2002/0124209 A1 | 9/2002 | Faust et al. |
| 2002/0129355 A1 | 9/2002 | Velten et al. |
| 2002/0131404 A1 | 9/2002 | Mehta et al. |
| 2002/0144254 A1 | 10/2002 | Owada |
| 2002/0152005 A1 | 10/2002 | Bagnordi |
| 2002/0156863 A1 | 10/2002 | Peng |
| 2002/0157089 A1 | 10/2002 | Patel et al. |
| 2002/0157090 A1 | 10/2002 | Anton, Jr. |
| 2002/0159479 A1 | 10/2002 | Watanuki et al. |
| 2002/0162098 A1 | 10/2002 | Suzuki |
| 2002/0166027 A1 | 11/2002 | Shirasawa et al. |
| 2002/0170052 A1 | 11/2002 | Radatti |
| 2002/0174422 A1 | 11/2002 | Kelley et al. |
| 2002/0178241 A1 | 11/2002 | Eriksson |
| 2002/0184619 A1 | 12/2002 | Meyerson |
| 2002/0188886 A1 | 12/2002 | Liu et al. |
| 2002/0194532 A1 | 12/2002 | Nagasawa |
| 2002/0197991 A1 | 12/2002 | Anvekar et al. |
| 2002/0198971 A1 | 12/2002 | Resnick et al. |
| 2002/0198976 A1 | 12/2002 | Davenport |
| 2003/0005108 A1 | 1/2003 | Bartley et al. |
| 2003/0005362 A1 | 1/2003 | Miller et al. |
| 2003/0005426 A1 | 1/2003 | Scholtens et al. |
| 2003/0009752 A1 | 1/2003 | Gupta |
| 2003/0013434 A1 | 1/2003 | Rosenberg et al. |
| 2003/0018524 A1 | 1/2003 | Fishman et al. |
| 2003/0018764 A1 | 1/2003 | Shell et al. |
| 2003/0018810 A1 | 1/2003 | Karagiannis et al. |
| 2003/0018889 A1 | 1/2003 | Burnett et al. |
| 2003/0022663 A1 | 1/2003 | Rajaram et al. |
| 2003/0023573 A1 | 1/2003 | Chan et al. |
| 2003/0023849 A1 | 1/2003 | Martin, Jr. |
| 2003/0023964 A1* | 1/2003 | Rajaram et al. ............ 717/172 |
| 2003/0027563 A1 | 2/2003 | Herle et al. |
| 2003/0027581 A1 | 2/2003 | Jokinen et al. |
| 2003/0033525 A1 | 2/2003 | Rajaram et al. |
| 2003/0033599 A1 | 2/2003 | Rajaram et al. |
| 2003/0037075 A1 | 2/2003 | Hannigan et al. |
| 2003/0041125 A1 | 2/2003 | Salomon |
| 2003/0043180 A1 | 3/2003 | Gusler et al. |
| 2003/0044086 A1 | 3/2003 | Jia et al. |
| 2003/0046485 A1 | 3/2003 | Zitlaw |
| 2003/0046680 A1 | 3/2003 | Gentry |
| 2003/0054811 A1 | 3/2003 | Han et al. |
| 2003/0055919 A1 | 3/2003 | Fong et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084177 A1 | 5/2003 | Mulligan |
| 2003/0084283 A1 | 5/2003 | Pixton |
| 2003/0084434 A1 | 5/2003 | Ren |
| 2003/0084435 A1 | 5/2003 | Messer et al. |
| 2003/0092438 A1 | 5/2003 | Moore et al. |
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0117956 A1 | 6/2003 | Lee |
| 2003/0121032 A1 | 6/2003 | Cho et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0154471 A1 | 8/2003 | Teachman et al. |
| 2003/0156719 A1 | 8/2003 | Cronce |
| 2003/0162533 A1 | 8/2003 | Moles et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177485 A1 | 9/2003 | Waldin, Jr. et al. |
| 2003/0182414 A1 | 9/2003 | O'Neill |
| 2003/0186689 A1 | 10/2003 | Herle et al. |
| 2003/0186722 A1 | 10/2003 | Weiner |
| 2003/0188120 A1* | 10/2003 | Maeda ............ 711/170 |
| 2003/0188156 A1 | 10/2003 | Yasala et al. |
| 2003/0191955 A1 | 10/2003 | Wagner et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0204640 A1 | 10/2003 | Sahinoja et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1 | 11/2003 | Deshpande et al. |
| 2003/0226030 A1 | 12/2003 | Hurst et al. |
| 2003/0226137 A1 | 12/2003 | Nagao |
| 2003/0233649 A1 | 12/2003 | Reimert |
| 2004/0006760 A1 | 1/2004 | Gove et al. |
| 2004/0008113 A1 | 1/2004 | Pradhan et al. |
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0031027 A1 | 2/2004 | Hiltgen |
| 2004/0031029 A1 | 2/2004 | Lee et al. |
| 2004/0031031 A1 | 2/2004 | Rudelic |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |

| Publication No. | Date | Inventor |
|---|---|---|
| 2004/0049394 A1 | 3/2004 | Burger et al. |
| 2004/0049609 A1 | 3/2004 | Simonson et al. |
| 2004/0054764 A1 | 3/2004 | Aderton et al. |
| 2004/0054995 A1 | 3/2004 | Lee |
| 2004/0058651 A1 | 3/2004 | Ross et al. |
| 2004/0058652 A1 | 3/2004 | McGregor et al. |
| 2004/0059725 A1 | 3/2004 | Sharangpani et al. |
| 2004/0062130 A1 | 4/2004 | Chiang |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0082346 A1 | 4/2004 | Skytt et al. |
| 2004/0083472 A1 | 4/2004 | Rao et al. |
| 2004/0088281 A1 | 5/2004 | Matsuishi |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokorny et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |
| 2004/0143573 A1 | 7/2004 | Burkey et al. |
| 2004/0143836 A1 | 7/2004 | McCormack et al. |
| 2004/0148379 A1 | 7/2004 | Ogura |
| 2004/0150519 A1 | 8/2004 | Husain et al. |
| 2004/0152455 A1 | 8/2004 | Herle |
| 2004/0153327 A1 | 8/2004 | Liu et al. |
| 2004/0153356 A1 | 8/2004 | Lockwood et al. |
| 2004/0158583 A1 | 8/2004 | Kaappa |
| 2004/0158829 A1 | 8/2004 | Beresin et al. |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0204117 A1 | 10/2004 | Weiner |
| 2004/0208182 A1 | 10/2004 | Boles et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0224679 A1 | 11/2004 | Okoro et al. |
| 2004/0226008 A1 | 11/2004 | Jacobi et al. |
| 2004/0229684 A1 | 11/2004 | Blackburn et al. |
| 2004/0237081 A1 | 11/2004 | Homiller |
| 2004/0239975 A1 | 12/2004 | Kawaura et al. |
| 2004/0242286 A1 | 12/2004 | Benco et al. |
| 2004/0243991 A1 | 12/2004 | Gustafson et al. |
| 2004/0243992 A1 | 12/2004 | Gustafson et al. |
| 2004/0243993 A1 | 12/2004 | Okonnen et al. |
| 2004/0244008 A1 | 12/2004 | Lee |
| 2004/0250245 A1 | 12/2004 | Rao et al. |
| 2004/0255291 A1 | 12/2004 | Sierer et al. |
| 2004/0257208 A1 | 12/2004 | Huang et al. |
| 2004/0261072 A1 | 12/2004 | Herle et al. |
| 2004/0261073 A1 | 12/2004 | Herle et al. |
| 2004/0267481 A1* | 12/2004 | Resnick et al. ............... 702/117 |
| 2004/0267833 A1 | 12/2004 | Meller et al. |
| 2004/0268041 A1 | 12/2004 | Smith |
| 2005/0005268 A1 | 1/2005 | Zilvay et al. |
| 2005/0010552 A1 | 1/2005 | Kaappa |
| 2005/0010585 A1 | 1/2005 | Sahinoja et al. |
| 2005/0027867 A1 | 2/2005 | Mueller et al. |
| 2005/0033774 A1 | 2/2005 | Brentano et al. |
| 2005/0033829 A1 | 2/2005 | Oommen |
| 2005/0037762 A1 | 2/2005 | Gurbani et al. |
| 2005/0038955 A1 | 2/2005 | Chen |
| 2005/0039178 A1 | 2/2005 | Marolia et al. |
| 2005/0055397 A1 | 3/2005 | Zhu et al. |
| 2005/0055453 A1 | 3/2005 | Zhu |
| 2005/0055595 A1 | 3/2005 | Frazer et al. |
| 2005/0060361 A1 | 3/2005 | Chatrath et al. |
| 2005/0060699 A1 | 3/2005 | Kim et al. |
| 2005/0066019 A1 | 3/2005 | Egan et al. |
| 2005/0071385 A1 | 3/2005 | Rao |
| 2005/0073438 A1 | 4/2005 | Rodgers et al. |
| 2005/0079863 A1 | 4/2005 | Macaluso |
| 2005/0084079 A1 | 4/2005 | Lang |
| 2005/0086328 A1 | 4/2005 | Landram et al. |
| 2005/0096025 A1 | 5/2005 | Qumei et al. |
| 2005/0097544 A1 | 5/2005 | Kim |
| 2005/0102615 A1 | 5/2005 | Roman et al. |
| 2005/0114493 A1 | 5/2005 | Mandato et al. |
| 2005/0114504 A1 | 5/2005 | Marolia et al. |
| 2005/0114852 A1 | 5/2005 | Chen et al. |
| 2005/0132179 A1 | 6/2005 | Glaum et al. |
| 2005/0132349 A1 | 6/2005 | Roberts et al. |
| 2005/0135286 A1 | 6/2005 | Nurminen et al. |
| 2005/0136942 A1 | 6/2005 | Timiri et al. |
| 2005/0144609 A1 | 6/2005 | Rothman et al. |
| 2005/0144612 A1 | 6/2005 | Wang et al. |
| 2005/0148359 A1 | 7/2005 | Joeressen |
| 2005/0153741 A1 | 7/2005 | Chen et al. |
| 2005/0160195 A1 | 7/2005 | Bruner et al. |
| 2005/0170863 A1 | 8/2005 | Shostak |
| 2005/0172117 A1 | 8/2005 | Aura |
| 2005/0172141 A1 | 8/2005 | Gayde et al. |
| 2005/0182697 A1 | 8/2005 | Rao |
| 2005/0198062 A1 | 9/2005 | Shapiro |
| 2005/0198379 A1 | 9/2005 | Panasyuk et al. |
| 2005/0204068 A1 | 9/2005 | Zhu et al. |
| 2005/0204353 A1 | 9/2005 | Ji |
| 2005/0216902 A1 | 9/2005 | Schaefer |
| 2005/0216903 A1 | 9/2005 | Schaefer |
| 2005/0220079 A1 | 10/2005 | Asokan |
| 2005/0227677 A1 | 10/2005 | Kallio |
| 2005/0227683 A1 | 10/2005 | Draluk et al. |
| 2005/0228847 A1 | 10/2005 | Hayes, Jr. |
| 2005/0228874 A1 | 10/2005 | Edgett et al. |
| 2005/0233733 A1 | 10/2005 | Roundtree et al. |
| 2005/0234967 A1 | 10/2005 | Draluk et al. |
| 2005/0239447 A1 | 10/2005 | Holzman et al. |
| 2005/0246703 A1 | 11/2005 | Ahonen |
| 2005/0251848 A1 | 11/2005 | Al-Janabi |
| 2005/0257214 A1 | 11/2005 | Moshir et al. |
| 2005/0264404 A1 | 12/2005 | Franczyk et al. |
| 2005/0268296 A1 | 12/2005 | Marolia et al. |
| 2005/0272455 A1 | 12/2005 | Oommen |
| 2005/0278399 A1 | 12/2005 | Herle et al. |
| 2005/0278715 A1 | 12/2005 | Herle et al. |
| 2005/0282533 A1 | 12/2005 | Draluk et al. |
| 2006/0007901 A1 | 1/2006 | Roskowski et al. |
| 2006/0010437 A1 | 1/2006 | Marolia |
| 2006/0015626 A1 | 1/2006 | Hallamaa et al. |
| 2006/0015860 A1 | 1/2006 | Liu et al. |
| 2006/0020947 A1 | 1/2006 | Hallamaa et al. |
| 2006/0026228 A1 | 2/2006 | Kim |
| 2006/0031449 A1 | 2/2006 | Hallamaa et al. |
| 2006/0036493 A1 | 2/2006 | Aufricht et al. |
| 2006/0036874 A1 | 2/2006 | Cockerille et al. |
| 2006/0036941 A1 | 2/2006 | Neil |
| 2006/0039313 A1 | 2/2006 | Chou et al. |
| 2006/0039561 A1 | 2/2006 | Ypya et al. |

| | | |
|---|---|---|
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1* | 4/2006 | Winters et al. .......... 717/168 |
| 2006/0080659 A1 | 4/2006 | Ganji |
| 2006/0080681 A1 | 4/2006 | Anwar et al. |
| 2006/0087982 A1 | 4/2006 | Kuure et al. |
| 2006/0089999 A1 | 4/2006 | Xiang et al. |
| 2006/0101040 A1 | 5/2006 | Ren et al. |
| 2006/0106806 A1 | 5/2006 | Sperling et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0093243 A1 | 4/2007 | Kapadekar et al. |
| 2007/0106806 A1 | 5/2007 | Tu et al. |
| 2007/0132774 A1 | 6/2007 | Fan et al. |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1 | 7/2007 | Lill et al. |
| 2007/0169089 A1 | 7/2007 | Bantz et al. |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032763 A1 | 2/2008 | Giobbi |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |
| JP | 61173360 | 8/1986 |
| JP | 07160490 | 6/1995 |
| JP | 07219780 | 8/1995 |
| JP | 08202626 | 8/1996 |
| JP | 8202626 | 8/1996 |
| JP | 11003223 | 1/1999 |
| JP | 11161479 | 6/1999 |
| JP | 11272454 | 10/1999 |
| JP | 11345127 | 12/1999 |
| JP | 2001233353 | 2/2003 |
| KR | 19990050594 | 11/1999 |
| KR | 2002-0034228 | 5/2000 |

| | | |
|---|---|---|
| KR | 20010046714 | 6/2001 |
| KR | 20010076555 | 8/2001 |
| KR | 2001-0100328 | 11/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 100986487 | 10/2010 |
| KR | 101085987 | 11/2011 |
| TW | 090107418 | 1/2003 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | 0106798 | 1/2001 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO03010656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Deitel and Deitel, "C How to Program", 1994, Prentice-Hall, Inc., Second Edition, Chapter 5.*

W. J. Meyers. 1980. Design of a microcode link editor. In Proceedings of the 13th annual workshop on Microprogramming (MICRO 13). IEEE Press, Piscataway, NJ, USA, 165-170.*

"ILOG Delivers Enterprise-Wide Business Rule Management With ILOG JRules 4.5", Jun. 10, 2003, Press Release, Archived Aug. 4, 2003 at http://web.archive.org/web/20030804140400/http://www.ilog.com/corporate/releases/us/030610_jrules45.cfm.*

Randal C. Burns and Darrell D. E. Long. 1998. In-place reconstruction of delta compressed files. In Proceedings of the seventeenth annual ACM symposium on Principles of distributed computing (PODC '98). ACM, New York, NY, USA, 267-275. DOI=10.1145/277697.277747 http://doi.acm.org/10.1145/277697.277747.*

European Search Report, Appln. No. 04759830.5 dated Jan. 18, 2008.

"Focus on Open View a Guide to Hewlett-Packard's Network and Systems Management Platform," Nathan J. Muller, pp. 1-291, CBM Books, published 1995.

"Client Server Computing in Mobile Environments," J. Jing et al., ACM Computing Surveys, vol. 31, Issue 2, pp. 117-159, ACM Press, Jul. 1999.

"ESW4: Enhanced Scheme for WWW Computing in Wireless Communication Environments," S. Hadjiefthymiades, et al. ACM SIGCOMM Computer Communication Review, vol. 29, Issue 5, pp. 24-35, ACM Press, Oct. 1999.

"Introducing Quality-of-Service and Traffic Classes in Wireless Mobile Networks," J. Sevanto, et al. Proceedings of the 1st ACM International Workshop on Wireless Mobile Multimedia, pp. 21-29, ACM Press, 1998.

"Any Network, Any Terminal, Anywhere," A Fasbender et al., IEEE Personal Communications, Apr. 1999, pp. 22-30, IEEE Press, 1999.

Meyers, W.J., "Design of a Microcode Link Editor", Proceedings of the 13th Annual Workshop on Microprogramming, pp. 165-170.

Computer Dictionary, Microsoft Press, 2002, pp. 380 and 423.

Koenig et al. "Re: ext2—available+used not equal to total" Dec. 31, 1998, acessed on Oct. 9, 2007 from <http://www.uwsg.iu.edu/hypermail/linux/kernel/9901.0/0270.html>, Linux Kernel Archive, 1 page.

Bettini, L., "Software Update via Mobile Agent Based Programming," Proc. ACM SAC, Jan. 1, 2002, pp. 32-36.

Bitfone Corp., Ca Office Action Jun. 8, 2007, CA App. No. 2,414,281, 4 p.

Bitfone Corp., CN Office Action Jun. 5, 2009, CN App. No. 200610067641.4, 12 p.

Bitfone Corp., CN Office Action Dec. 12, 2010, CN App. No. 200610067641.4, 3 p.

Bitfone Corp., EP Office Action Mar. 16, 2010, EP App. No. EP04777313.0, 8 p.

Bitfone Corp., EP Search Report Mar. 22, 2012, EP App. No. 06251423.7, 6 p.

Bitfone Corp., EP Office Action Mar. 26, 2010, EP App. No. 04785381.7, 5 p.

Bitfone Corp., EP Office Action May 11, 2012, EP App. No. 04777313.0, 9 p.

Bitfone Corp., EP Search Report Jan. 18, 2008, EP App No. 04759830.5, 5 p.

Bitfone Corp., EP Search Report Mar. 20, 2011, EP App. No. 06251423.7, 7 p.

Bitfone Corp., EP Search Report Jul. 1, 2011, EP App. No. 06251423.7, 11 p.

Bitfone Corp., EP Search Report Jul. 4, 2006, EP App. No. EP06250739.7, 7 p.

Bitfone Corp., EP Search Report Jul. 19, 2006, EP App. No. 06251512.7, 8 p.

Bitfone Corp., EP Search Report Nov. 26, 2009, EP App. No. EP04777313.0, 3 p.

Bitfone Corp., Int'l Prelim Rpt Jan. 9, 2006, PCT App. No. PCT/US2004/022598, 7 p.

Bitfone Corp., Int'l Prelim Rpt Jan. 30, 2006, PCT App. No. PCT/US2004/024876, 8 p.

Bitfone Corp., Int'l Prelim Rpt Mar. 6, 2006, PCT App. No. PCT/US2004/028433, 8 p.

Bitfone Corp., Int'l Prelim Rpt Mar. 13, 2006, PCT App. No. PCT/US2004/021037, 7 p.

Bitfone Corp., Int'l Prelim Rpt Mar. 27, 2006, PCT App. No. PCT/US2004/031547, 9 p.
Bitfone Corp., Int'l Prelim Rpt Aug. 5, 2005, PCT App No. PCT/US2004/002950, 6 p.
Bitfone Corp., Int'l Prelim Rpt Aug. 12, 2005, PCT App. No. PCT/US2004/002084, 4 p.
Bitfone Corp., Int'l Prelim Rpt Sep. 30, 2008, PCT App. No. PCT/US2007/007489, 4 p.
Bitfone Corp., Int'l Prelim Rpt Oct. 1, 2005, PCT App. No. PCT/US2004/008918, 4 p.
Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.
Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 3 p.
Bitfone Corp., Int'l Search Report Jan. 20, 2006, PCT App. No. PCT/US2004/021037, 3 p.
Bitfone Corp., Int'l Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 12, 2008, PCT App. No. PCT/US2004/063899, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'l Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 3, 2008, PCT App. No. PCT/US2004/000694, 3 p.
Bitfone Corp., Int'l Search Report Oct. 14, 2004, PCT App. No. PCT/US2003/035377, 4 p.
Bitfone Corp., Int'l Search Report Dec. 3, 2004, PCT App. No. PCT/US2003/036995, 4 p.
Bitfone Corp., Int'l Search Report,JUl. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 16, 2011, Kr App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct., 1999.
Hoffmeyer et al., "Radio Software Download for Commercial Wireless Reconfigurable Devices," IEEE Communications Magazine, IEEE Service Center, New York, NY, US. vol. 42, No. 3, Mar. 2004, pp. S26-S32.
HPC, Int'l Search Report Sep. 5, 2007, PCT App. No. PCT/U52007/008415, 2 p.
HPDC, CN Office Action Sep. 22, 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.

HPDC, EP Office Action Oct. 15, 2009, EPp App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.
HPDC, EP Search Report Mar. 6, 2009, EP App. No. 01991949.7, 7 p.
HPDC, EP Search Report Jun. 3, 2009, EP App. No. 01991949.7, 7 p.
HPDC, EP Search Report Aug. 9, 2010, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.
HPDC, Int'l Search Report Apr. 10, 2008, PCT App No. PCT/US2007/070534, 7 p.
HPDC, Int'l Search Report Jun. 26, 2008, PCT App. No. PCT/US2007/076006, 5 p.
HPDC, Int'l Search Report Jul. 18, 2008, PCT App. No. PCT/US2007/077288, 5 p.
HPDC, Int'l Search Report Aug. 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HDPC, KR Office Action May, 6, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 1999, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for Lzss Encoded Files," 2007 Data Compression Conference (Dcc'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kerne1/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75- 84.
Memorymanagement.Org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE Apr. 10-11, 2000, 4 p.
Open Mobile Alliance, "Device Management Protocol, Candidate," Ver 1.2, Jun. 2, 2006.
Open Mobile Alliance, "Generic Content Download Over the Air Specification," Version 1.0, Sep. 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," Codes+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.
Satoh et al., Experiment of Component-Based Software Development on Multiple Distributed Object Environments, IEEE, 1998, 8 p.
Sevanto et al., "Introducing Quality-of-Service and Traffic Classes into Wireless Mobile Networks," Wowmom 98 Dallas, Texas, USA, Copyright ACM 1998 pp. 21-30.

Symborski, C. W., "Updating Softwaare and Configuration Data in a Distributed Communications Nev.'Vork". 1988 Computer NetworKing Symposium, 8 p.

Varshney et al., "Emerging Mobile and Wireless Networks," Communications of the ACM Jun. 2000, vol. 43, No. 6, pp. 73-81.

W3C, XML Signature Syntax and Processing, (2nd edition), Jun. 10, 2008, 1 p. [Online] http://www.w3.org/TR/xmldsig-core/.

White, Ron, "How Computers Work," Millennium Ed., Que Corporation, Indianapolis, in, 1999, 284 p.

Yergeau, F., "UTF-8, a transformation format of ISO 10646," Jan. 1998, Alis Technologies, 10 p.

Yoshimura et al., "Mobile Streaming Media CDN Enabled by Dynamic SMIL," WWW2003, May 7-11, 2002, Honolulu, Hawaii, ACM, pp. 651-661.

Wheatley, Office Action Dec. 27, 2011, U.S. Appl. No. 12/057,044, Mar. 27, 2008, 6 p.

Rao, Office Action Nov. 14, 2008, U.S. Appl. No. 11/057,361, Feb. 14, 2005, 8 p.

Insun, Office Action Feb. 3, 2010, U.S. Appl. No. 11/111,276, Apr. 21, 2005, 10 p.

Insun, Office Action Jul. 12, 2010, U.S. Appl. No. 11/111,276, Apr. 21, 2005, 11 p.

Iyad, Office Action Jan. 28, 2008, U.S. Appl. No. 11/100,305, Apr. 6, 2005, 20 p.

Iyad, Final Office Action Jul. 22, 2008, U.S. Appl. No. 11/100,305, Apr. 6, 2005, 11 p.

Iyad, Office Action Jan. 21, 2009, U.S. Appl. No. 11/100,305, Apr. 6, 2005, 7 p.

Iyad, Final Office Action Jul. 8, 2009, U.S. Appl. No. 11/100,305, Apr. 6, 2005, 25 p.

Shao-Chun, Office Action Dec. 11, 2008, U.S. Appl. No. 11/120,556, May 3, 2005, 28 p.

Shao-Chun, Final Office Action May 26, 2009, U.S. Appl. No. 11/120,556, May 3, 2005, 30 p.

Shao-Chun, Office Action Oct. 28, 2009, U.S. Appl. No. 11/120,556, May 3, 2005, 31 p.

Shao-Chun, Final Office Action May 13, 2010, U.S. Appl. No. 11/120,556, May 3, 2005 32 p.

Shao-Chun, Office Action Nov. 29, 2010, 11/120,556, May 3, 2005, 26 p.

Shao-Chun, Office Action Oct. 29, 2008, U.S. Appl. No. 11/124,866, May 9, 2005, 13 p.

Shao-Chun, Office Action May 5, 2009, U.S. Appl. No. 11/124,866, May 9, 2005, 14 p.

Shao-Chun, Office Action Nov. 12, 2008, U.S. Appl. No. 11/144,537, Jun. 3, 2005, 16 p.

Shao-Chun, Final Office Action Apr. 29, 2009, U.S. Appl. No. 11/144,537, Jun. 3, 2005, 22 p.

Sunil, Office Action Aug. 20, 2008, U.S. Appl. No. 11/189,344, Jul. 26, 2005, 12 p.

Sunil, Final Office Action Feb. 19, 2009, U.S. Appl. No. 11/189,344, Jul. 26, 2005, 13 p.

Sunil, Office Action Aug. 19, 2009, U.S. Appl. No. 11/189,344, Jul. 26, 2005, 10 p.

Sunil, Office Action Sep. 4, 2008, U.S. Appl. No. 11/226,032, Sep. 14, 2005, 17 p.

Sunil, Final Office Action Jul. 6, 2009, U.S. Appl. No. 11/226,032, Sep. 14, 2005, 17 p.

Sunil, Office Action Dec. 14, 2009, U.S. Appl. No. 11/226,032, Sep. 14, 2005, 23 p.

Sunil, Final Office Action Apr. 29, 2010, U.S. Appl. No. 11/226,032, Sep. 14, 2005, 16 p.

Rao, Office Action Aug. 21, 2009, U.S. Appl. No. 11/247,463, Oct. 11, 2005, 18 p.

Rao, Final Office Action Jul. 13, 2010, U.S. Appl. No. 11/247,463, Oct. 11, 2005, 19 p.

Rao, Office Action Mar. 8, 2011, U.S. Appl. No. 11/247,463, Oct. 11, 2005, 20 p.

Rao, Final Office Action Aug. 30, 2011, U.S. Appl. No. 11/247,463, Oct. 11, 2005, 20 p.

Shao-Chun, Office Action Jul. 8, 2009, U.S. Appl. No. 11/316,291, Dec. 21, 2005, 18 p.

Shao-Chun, Final Office Action Dec. 2, 2009, U.S. Appl. No. 11/316,291, Dec. 21, 2005, 18 p.

Giovanni, Office Action Jul. 8, 2009, U.S. Appl. No. 11/316,292, Dec. 21, 2005, 8 p.

Giovanni, Office Action Jan. 25, 2010, U.S. Appl. No. 11/316,292, Dec. 21, 2005, 7 p.

Shao-Chun, Office Action May 27, 2009, U.S. Appl. No. 11/352,813, Feb. 13, 2006, 31 p.

Sunil, Office Action Jun. 10, 2008, U.S. Appl. No. 11/352,702, Feb. 13, 2006, 8 p.

Sunil, Final Office Action Mar. 20, 2009, U.S. Appl. No. 11/352,702, Feb. 13, 2006, 11 p.

Sunil, Office Action Sep. 28, 2009, U.S. Appl. No. 11/352,702, Feb. 13, 2006, 9 p.

Sunil, Final Office Action Mar. 16, 2010, U.S. Appl. No. 11/352,702, Feb. 13, 2006, 11 p.

Rao, Office Action Feb. 17, 2009, U.S. Appl. No. 11/374,481, Mar. 9, 2006, 17 p.

Rao, Final Office Action Jul. 21, 2009, U.S. Appl. No. 11/374,481, Mar. 9, 2006, 18 p.

Rao, Office Action Jan. 4, 2010, U.S. Appl. No. 11/374,481, Mar. 9, 2006, 10 p.

Jason, Office Action Oct. 16, 2008, U.S. Appl. No. 11/369,561, Mar. 7, 2006, 13 p.

Jason, Final Office Action May 8, 2009, U.S. Appl. No. 11/369,561, Mar. 7, 2006, 14 p.

Rao, Office Action Mar. 12, 2009, U.S. Appl. No. 11/385,162, Mar. 21, 2006, 6 p.

Rao, Office Action Sep. 25, 2009, U.S. Appl. No. 11/385,162, Mar. 21, 2006, 8 p.

Rao, Final Office Action May 4, 2010, U.S. Appl. No. 11/385,162, Mar. 21, 2006, 8 p.

Sunil, Office Action Nov. 13, 2008, U.S. Appl. No. 11/189,944, Jul. 26, 2005, 19 p.

Sunil, Final Office Action Apr. 27, 2009, U.S. Appl. No. 11/189,944, Jul. 26, 2005, 21 p.

Glenn, Office Action May 29, 2009, U.S. Appl. No. 11/478,108, Jun. 28, 2006, 19 p.

Glenn, Office Action Dec. 18, 2009, U.S. Appl. No. 11/478,108, Jun. 26, 2006, 17 p.

Glenn, Final Office Action Apr. 27, 2010, U.S. Appl. No. 11/478,108, Jun. 28, 2006, 17 p.

Glenn, Office Action Sep. 2, 2010, U.S. Appl. No. 11/478,108, Jun. 28, 2006, 21 p.

Glenn, Office Action Dec. 29, 2010, U.S. Appl. No. 11/478,108, Jun. 28, 2006, 16 p.

Rao, Office Action Apr. 6, 2010, U.S. Appl. No. 11/397,187, Apr. 4, 2006, 12 p.

Giovanni, Office Action May 26, 2010, U.S. Appl. No. 11/500,754, Aug. 7, 2006, 12 p.

Giovanni, Final Office Action Sep. 2, 2010, U.S. Appl. No. 11/500,754, Aug. 7, 2006, 17 p.

Uma, Office Action Oct. 6, 2009, U.S. Appl. No. 11/707,505, Feb. 16, 2007, 16 p.

Uma, Final Office Action Mar. 8, 2010, U.S. Appl. No. 11/707,505, Feb. 16, 2007 17 p.

Uma, Office Action Dec. 10, 2010, U.S. Appl. No. 11/707,505, Feb. 16, 2007 12 p.

Sunil, Office Action Oct. 7, 2010, U.S. Appl. No. 11/824,344, Jun. 29, 2007, 7 p.

Marko, Office Action Apr. 6, 2009, U.S. Appl. No. 11/732,267, Apr. 2, 2007, 23 p.

Marko, Final Office Action Oct. 9, 2009, U.S. Appl. No. 11/732,267, Apr. 2, 2007, 10 p.

Rao, Office Action Oct. 9, 2009, U.S. Appl. No. 11/799,586, May 2, 2007, 18 p.

Rao, Final Office Action Mar. 8, 2010, U.S. Appl. No. 11/799,586, May 2, 2007, 18 p.

Rao, Office Action Aug. 18, 2010, U.S. Appl. No. 11/799,586, May 2, 2007, 19 p.

Rao, Office Action Mar. 21, 2008, U.S. Appl. No. 11/728,517, Mar. 26, 2007, 17 p.

Rao, Office Action Oct. 20, 2008, U.S. Appl. No. 11/728,517, Mar. 26, 2007, 21 p.
Rao, Office Action Apr. 13, 2009, U.S. Appl. No. 11/728,517, Mar. 26, 2007, 23 p.
Rao, Office Action Dec. 3, 2009, U.S. Appl. No. 11/728,517, Mar. 26, 2007, 19 p.
Rao, Final Office Action Jun. 24, 1970, U.S. Appl. No. 11/728,517, Mar. 26, 2007, 25 p.
Marolia, Office Action Jul. 28, 2009, U.S. Appl. No. 11/827,583, Jul. 12, 2007, 18 p.
Rao, Office Action Jun. 16, 2009, U.S. Appl. No. 11/839,143, Aug. 15, 2007, 11 p.
Rao, Final Office Action Jan. 8, 2010, U.S. Appl. No. 11/839,143, Aug. 15, 2007, 15 p.
Rao, Office Action Aug. 4, 2010, U.S. Appl. No. 11/839,143, Aug. 15, 2007, 16 p.
Rao, Final Office Action Oct. 5, 2011, U.S. Appl. No. 11/839,143, Aug. 15, 2007, 20 p.
Rao, Office Action May 13, 2011, U.S. Appl. No. 11/839,143, Aug. 15, 2007, 17 p.
Rao, Final Office Action Aug. 23, 2011, U.S. Appl. No. 11/839,143, Aug. 15, 2007, 17 p.
Rao, Office Action Sep. 17, 2009, U.S. Appl. No. 11/847,658, Aug. 30, 2007, 10 p.
Rao, Office Action Mar. 25, 2010, U.S. Appl. No. 11/847,658, Aug. 30, 2007, 11 p.
Rao, Office Action Aug. 25, 2010, U.S. Appl. No. 11/847,658, Aug. 30, 2007, 13 p.
Rao, Office Action Nov. 18, 2010, U.S. Appl. No. 11/847,658, Aug. 30, 2007, 11 p.
Rao, Office Action Aug. 24, 2010, U.S. Appl. No. 11/854,414, Sep. 12, 2007, 14 p.
Rao, Office Action Nov. 17, 2009, U.S. Appl. No. 11/947,322, Nov. 29, 2007, 15 p.
Rao, Final Office Action May 14, 2010, U.S. Appl. No. 11/947,322, Nov. 29, 2007, 22 p.
Rao, Office Action Dec. 27, 2010, U.S. Appl. No. 11/947,322, Nov. 29, 2007, 43 p.
Rao, Final Office Action May 26, 2011, U.S. Appl. No. 11/947,322, Nov. 29, 2007, 40 p.
Rao, Office Action Jan. 9, 2012, U.S. Appl. No. 11/947,322, Nov. 29, 2007, 40 p.
Brunet, Office Action Jan. 25, 2006, U.S. Appl. No. 10/822,092, Apr. 9, 2004, 14 p.
Brunet, Final Office Action Aug. 23, 2006, U.S. Appl. No. 10/822,092, Apr. 9, 2004, 13 p.
Brunet, Office Action Feb. 22, 2007, U.S. Appl. No. 10/822,092, Apr. 9, 2004, 19 p.
Brunet, Final Office Action Nov. 15, 2007, U.S. Appl. No. 10/822,092, Apr. 9, 2004, 22 p.
Brunet, Office Action Apr. 4, 2008, U.S. Appl. No. 10/822,092, Apr. 9, 2004, 27 p.
Brunet, Final Office Action Sep. 23, 2008, U.S. Appl. No. 10/822,092, Apr. 9, 2004, 28 p.
Brunet, Office Action Mar. 8, 2007, U.S. Appl. No. 10/889,693, Jul. 12, 2004, 17 p.
Brunet, Final Office Action Nov. 28, 2007, U.S. Appl. No. 10/889,693, Jul. 12, 2004, 19 p.
Brunet, Office Action Jun. 25, 2008, U.S. Appl. No. 10/889,693, Jul. 12, 2004, 69 p.
Brunet, Final Office Action Dec. 23, 2008, U.S. Appl. No. 10/889,693, Jul. 12, 2004, 23 p.
Brunet, Office Action Jun. 29, 2006, U.S. Appl. No. 10/999,606, Nov. 29, 2004, 9 p.
Brunet, Final Office Action Mar. 7, 2007, U.S. Appl. No. 10/999,606, Nov. 29, 2004, 10 p.
Brunet, Office Action Apr. 18, 2008, U.S. Appl. No. 10/999,606, Nov. 29, 2004, 6 p.
Brunet, Office Action Apr. 24, 2009, U.S. Appl. No. 10/999,606, Nov. 29, 2004, 12 p.
Brunet, Final Office Action Aug. 20, 2009, U.S. Appl. No. 10/999,606, Nov. 29, 2004, 16 p.
Brunet, Office Action Nov. 10, 2009, U.S. Appl. No. 10/999,606, Nov. 29, 2004, 16 p.
Brunet, Final Office Action Feb. 18, 2010, U.S. Appl. No. 10/999,606, Nov. 29, 2004, 16 p.
Shao-Chun, Office Action Jun. 6, 2007, U.S. Appl. No. 11/125,974, May 9, 2005, 9 p.
Shao-Chun, Office Action Jan. 17, 2008, U.S. Appl. No. 11/125,974, May 9, 2005, 9 p.
Shao-Chun, Final Office Action Aug. 18, 2008, U.S. Appl. No. 11/125,974, May 9, 2005, 13 p.
Jeffrey, Office Action Jul. 26, 2006, U.S. Appl. No. 11/247,459, Oct. 11, 2005, 9 p.
Jeffrey, Office Action May 15, 2007, U.S. Appl. No. 11/247,459, Oct. 11, 2005, 10 p.
Jeffrey, Office Action Oct. 31, 2007, U.S. Appl. No. 11/247,459, Oct. 11, 2005, 26 p.
O'Neill, Office Action Aug. 25, 2006, U.S. Appl. No. 10/311,462, May 13, 2003, 24 p.
O'Neill, Office Action Mar. 5, 2010, U.S. Appl. No. 10/311,462, May 13, 2003, 23 p.
O'Neill, Final Office Action Jul. 23, 2010, U.S. Appl. No. 10/311,462, May 13, 2003, 24 p.
O'Neill, Office Action Nov. 18, 2009, U.S. Appl. No. 11/335,312, Jan. 19, 2006, 12 p.
O'Neill, Office Action Mar. 12, 2004, U.S. Appl. No. 10/404,601, Apr. 1, 2003, 28 p.
Shao-Chun, Final Office Action Jul. 25, 2006, U.S. Appl. No. 10/411,784, Apr. 11, 2003, 22 p.
Shao-Chun, Office Action Mar. 27, 2007, U.S. Appl. No. 10/411,784, Apr. 11, 2003, 16 p.
Shao-Chun, Final Office Action Oct. 18, 2007, U.S. Appl. No. 10/411,784, Apr. 11, 2003, 15 p.
Rao, Examiner's Answer Dec. 6, 2011, U.S. Appl. No. 11/427,635, Jan. 24, 2005, 19 p.
Rao, Final Office Action Jun. 10, 2011, U.S. Appl. No. 11/427,635, Jan. 24, 2005, 18 p.
Rao, Office Action Dec. 27, 2010, U.S. Appl. No. 11/427,635 Jan. 24, 2005, 13 p.
Rao, Office Action Mar. 31, 2010, U.S. Appl. No. 11/427,635 Jan. 24, 2005, 14 p.
Rao, Office Action Oct. 15, 2009, U.S. Appl. No. 11/427,635, Jan. 24, 2005, 11 p.
Rao, Final Office Action Apr. 30, 2009, U.S. Appl. No. 11/427,635, Jan. 24, 2005, 13 p.
Rao, Office Action Nov. 26, 2008, U.S. Appl. No. 11/427,635, Jan. 24, 2005, 15 p.
Rao, Examiner's Answer Mar. 26, 2011, U.S. Appl. No. 11/043,813, Jan. 26, 2005, 16 p.
Rao, Final Office Action Aug. 20, 2010, U.S. Appl. No. 11/043,813, Jan. 26, 2005, 16 p.
Rao, Office Action Mar. 9, 2010, U.S. Appl. No. 11/043,813, Jan. 26, 2005, 14 p.
Rao, Final Office Action Nov. 13, 2009, U.S. Appl. No. 11/043,813, Jan. 26, 2005, 15 p.
Rao, Office Action Mar. 30, 2009, U.S. Appl. No. 11/043,813, Jan. 26, 2005, 11 p.
Rao, Office Action Oct. 2, 2008, U.S. Appl. No. 11/043,813, Jan. 26, 2005, 23 p.
Chen, Examiner's Answer Aug. 16, 2012, U.S. Appl. No. 11/099,870, Apr. 6, 2005, 12 p.
Chen, Final Office Action Dec. 23, 2011, U.S. Appl. No. 11/099,870, Apr. 6, 2005, 12 p.
Chen, Office Action Jul. 6, 2011, U.S. Appl. No. 11/099,870, Apr. 6, 2005, 13 p.
Chen, Final Office Action Nov. 26, 2010, U.S. Appl. No. 11/099,870, Apr. 6, 2005, 9 p.
Chen, Office Action Jun. 24, 2010, U.S. Appl. No. 11/099,870, Apr. 6, 2005, 7 p.
Chen, Office Action Nov. 30, 2009, U.S. Appl. No. 11/099,870, Apr. 6, 2005, 8 p.
Chen, Final Office Action Apr. 14, 2009, U.S. Appl. No. 11/099,870, Apr. 6, 2005, 19 p.

Chen, Office Action Sep. 24, 2008, U.S. Appl. No. 11/099,870, Apr. 6, 2005, 7 p.
Chen, Office Action Apr. 25, 2008, U.S. Appl. No. 11/099,870, Apr. 6, 2005, 5 p.
Chen, Final Office Action Oct. 11, 2007, U.S. Appl. No. 11/099,870, Apr. 6, 2005, 16 p.
Chen, Office Action Aug. 24, 2006, U.S. Appl. No. 11/099,870, Apr. 6, 2005, 15 p.
Zhu, Examiner's Answer Aug. 16, 2012, U.S. Appl. No. 11/386,560, Mar. 22, 2006, 9 p.
Zhu, Final Office Action Feb. 16, 2012, U.S. Appl. No. 11/386,560, Mar. 22, 2006, 23 p.
Zhu, Office Action Sep. 30, 2011, U.S. Appl. No. 11/386,560, Mar. 22, 2006, 19 p.
Zhu, Final Office Action Mar. 3, 2011, U.S. Appl. No. 11/386,560, Mar. 22, 2006, 24 p.
Zhu, Office Action Sep. 15, 2010, U.S. Appl. No. U.S. Appl. No. 11/386,560, Mar. 22, 2006, 21 p.
Zhu, Office Action Mar. 31, 2010, U.S. Appl. No. 11/386,560, Mar. 22, 2006, 17 p.
Chen, Decision on Appeal Jun. 29, 2012, U.S. Appl. No. 11/637,550, Dec. 12, 2006, 9 p.
Chen, Examiner's Answer Mar. 30, 2009, U.S. Appl. No. 11/637,550, Dec. 12, 2006, 18 p.
Chen, Final Office Action May 22, 2008, U.S. Appl. No. 11/637,550, Dec. 12, 2006, 18 p.
Chen, Office Action Oct. 5, 2007, U.S. Appl. No. 11/637,550, Dec. 12, 2006, 20 p.
Chen, Final Office Action Jul. 27, 2012, U.S. Appl. No. 12/057,067, Mar. 27, 2008, 20 p.
Chen, Office Action Feb. 2, 2012, U.S. Appl. No. 12/057,067, Mar. 27, 2008, 18 p.
Chen, Final Office Action Jul. 28, 2011, U.S. Appl. No. 12/057,067, Mar. 27, 2008, 17 p.
Chen, Office Action Feb. 16, 2011, U.S. Appl. No. 12/057,067, Mar. 27, 2008, 22 p.
O'Neill, Final Office Action Jul. 17, 2012, U.S. Appl. No. 10/411,835, Apr. 11, 2003, 32 p.
O'Neill, Office Action Feb. 10, 2012, U.S. Appl. No. 10/411,835, Apr. 11, 2003, 26 p.
O'Neill, Advisory Action Jul. 29, 2011, U.S. Appl. No. 10/411,835, Apr. 11, 2003, 3 p.
O'Neill, Advisory Action Jun. 28, 2011, U.S. Appl. No. 10/411,835, Apr. 11, 2003, 3 p.
O'Neill, Final Office Action Apr. 11, 2011, U.S. Appl. No. 10/411,835, Apr. 11, 2003, 29 p.
O'Neill, Office Action Nov. 8, 2010, U.S. Appl. No. 10/411,835, Apr. 11, 2003, 26 p.
O'Neill, Office Action Aug. 26, 2009, U.S. Appl. No. 10/411,835, Apr. 11, 2003, 25 p.
Chen, Notice of Allowance Aug. 31, 2012, U.S. Appl. No. 10/412,045, Apr. 11, 2003, 10 p.
Chen, Final Office Action Jan. 25, 2012, U.S. Appl. No. 10/412,045, Apr. 11, 2003, 18 p.
Chen, Office Action Aug. 3, 2011, U.S. Appl. No. 10/412,045, Apr. 11, 2003, 18 p.
Chen, Final Office Action Apr. 19, 2010, U.S. Appl. No. 10/412,045, Apr. 11, 2003, 25 p.
Chen, Office Action Aug. 26, 2009, U.S. Appl. No. 10/412,045, Apr. 11, 2003, 17 p.
O'Neill, Office Action Jul. 23, 2012, U.S. Appl. No. 12/636,600, Dec. 11, 2009, 17 p.
Rao, Examiner's Answer May 26, 2011, U.S. Appl. No. 11/637,435, Dec. 12, 2006, 20 p.
Rao, Final Office Action Sep. 15, 2010, U.S. Appl. No. 11/637,435, Dec. 12, 2006, 15 p.
Rao, Office Action Sep. 10, 2009, U.S. Appl. No. 11/637,435, Dec. 12, 2006, 16 p.
Rao, Final Office Action Mar. 17, 2009, U.S. Appl. No. 11/637,435, Dec. 12, 2006, 15 p.
Rao, Office Action Sep. 22, 2008, U.S. Appl. No. 11/637,435, Dec. 12, 2006, 14 p.
Rao, Decision on Appeal Jun. 29, 2012, U.S. Appl. No. 10/706,362, Nov. 12, 2003, 6 p.
Rao, Examiner Answer Oct. 30, 2009, U.S. Appl. No. 10/706,362, Nov. 12, 2003, 24 p.
Rao, Final Office Action Apr. 15, 2009, U.S. Appl. No. 10/706,362, Nov. 12, 2003, 20 p.
Rao, Office Action Oct. 1, 2008, U.S. Appl. No. 10/706,362, Nov. 12, 2003, 19 p.
Rao, Office Action Jan. 9, 2008, U.S. Appl. No. 10/706,362, Nov. 12, 2003, 16 p.
Rao, Office Action Jul. 31, 2007, U.S. Appl. No. 10/706,362, Nov. 12, 2003, 17 p.
Rao, Office Action Dec. 5, 2006, U.S. Appl. No. 10/706,362, Nov. 12, 2003, 15 p.
McGhee, Decision on Appeal Jun. 6, 2012, U.S. Appl. No. 10/774,027, Feb. 6, 2004, 8 p.
McGhee, Examiner's Answer Oct. 30, 2009, U.S. Appl. No. 10/774,027, Feb. 6, 2004, 31 p.
McGhee, Final Office Action Apr. 24, 2009, U.S. Appl. No. 10/774,027, Feb. 6, 2004, 23 p.
McGhee, Office Action Oct. 15, 2008, U.S. Appl. No. 10/774,027, Feb. 6, 2004, 25 p.
McGhee, Office Action Mar. 4, 2008, U.S. Appl. No. 10/774,027, Feb. 6, 2004, 26 p.
Yang, Corrected Examiner's Answer Nov. 21, 2011, U.S. Appl. No. 12/030,757, Feb. 13, 2008, 2 p.
Yang, Examiner's Answer Nov. 10, 2011, U.S. Appl. No. 12/030,757, Feb. 13, 2008, 19 p.
Yang, Advisory Action Sep. 29, 2011, U.S. Appl. No. 12/030,757, Feb. 13, 2008, 3 p.
Yang, Final Office Action Jul. 14, 2011, U.S. Appl. No. 12/030,757, Feb. 13, 2008, 17 p.
Yang, Office Action Mar. 9, 2011, U.S. Appl. No. 12/030,757, Feb. 13, 2008, 33 p.
Rao, Final Office Action Nov. 20, 2012, U.S. Appl. No. 10/909,550, Aug. 2, 2004, 20 p.
Rao, Office Action Jun. 19, 2012, U.S. Appl. No. 10/909,550, Aug. 2, 2004, 24 p.
Rao, Advisory Action Oct. 8, 2010, U.S. Appl. No. 10/909,550, Aug. 2, 2004, 3 p.
Rao, Advisory Action Sep. 1, 2010, U.S. Appl. No. 10/909,550, Aug. 2, 2004, 3 p.
Rao, Final Office Action Jun. 3, 2010, U.S. Appl. No. 10/909,550, Aug. 2, 2004, 26 p.
Rao, Office Action Nov. 27, 2009, U.S. Appl. No. 10/909,550, Aug. 2, 2004, 17 p.
Rao, Office Action Jun. 23, 2009, U.S. Appl. No. 10/909,550, Aug. 2, 2004, 7 p.
Rao, Final Office Action Sep. 25, 2008, U.S. Appl. No. 10/909,550, Aug. 2, 2004, 19 p.
Rao, Office Action Apr. 23, 2008, U.S. Appl. No. 10/909,550, Aug. 2, 2004, 29 p.
Chia, Notice of Allowance May 31, 2012, U.S. Appl. No. 10/943,455, Sep. 17, 2004, 11 p.
Chia, Final Office Action Dec. 8, 2011, U.S. Appl. No. 10/943,455, Sep. 17, 2004, 23 p.
Chia, Office Action Jun. 22, 2010, U.S. Appl. No. 10/943,455, Sep. 17, 2004, 34 p.
Chia, Office Action Jan. 7, 2010, U.S. Appl. No. 10/943,455, Sep. 17, 2004, 21 p.
Chia, Office Action Jun. 11, 2009, U.S. Appl. No. 10/943,455, Sep. 17, 2004, 18 p.
Chia, Final Office Action Dec. 24, 2008, U.S. Appl. No. 10/943,455, Sep. 17, 2004, 17 p.
Chia, Office Action Mar. 21, 2008, U.S. Appl. No. 10/943,455, Sep. 17, 2004, 22 p.
Wang, Examiner's Answer Aug. 19, 2011, U.S. Appl. No. 11/183,199, Jul. 15, 2005, 23 p.
Wang, Advisory Action Feb. 23, 2011, U.S. Appl. No. 11/183,199, Jul. 15, 2005, 2 p.
Wang, Final Office Action Nov. 1, 2010, U.S. Appl. No. 11/183,199, Jul. 15, 2005, 19 p.

Wang, Office Action Apr. 28, 2010, U.S. Appl. No. 11/183,199, Jul. 15, 2005, 17 p.
Wang, Final Office Action Aug. 17, 2009, U.S. Appl. No. 11/183,199, Jul. 15, 2005, 16 p.
Wang, Office Action Feb. 13, 2009, U.S. Appl. No. 11/183,199, Jul. 15, 2005, 16 p.
Wang, Interview Summary Feb. 5, 2009, U.S. Appl. No. 11/183,199, Jul. 15, 2005, 2 p.
Wang, Final Office Action Oct. 28, 2008, U.S. Appl. No. 11/183,199, Jul. 15, 2005, 19 p.
Wang, Office Action Apr. 17, 2008, U.S. Appl. No. 11/183,199, Jul. 15, 2005, 41 p.
Wang, Final Office Action Oct. 9, 2007, U.S. Appl. No. 11/183,199, Jul. 15, 2005, 13 p.
Wang, Office Action Jan. 9, 2007, U.S. Appl. No. 11/183,199, Jul. 15, 2005, 15 p.
Randall, Examiner's Answer Jun. 9, 2010, U.S. Appl. No. 10/955,021, Sep. 30, 2004, 22 p.
Randall, Final Office Action Nov. 6, 2009, U.S. Appl. No. 10/955,021, Sep. 30, 2004, 25 p.
Randall, Office Action Apr. 1, 2009, U.S. Appl. No. 10/955,021, Sep. 30, 2004, 16 p.
Randall, Office Action Oct. 17, 2008, U.S. Appl. No. 10/955,021, Sep. 30, 2004, 16 p.
Randall, Office Action May 1, 2008, U.S. Appl. No. 10/955,021, Sep. 30, 2004, 18 p.
Daley, Corrected Examiner's Answer Nov. 1, 2011, U.S. Appl. No. 11/039,000, Jan. 18, 2005, 2 p.
Daley, Examiner's Answer Oct. 24, 2011, U.S. Appl. No. 11/039,000, Jan. 18, 2005, 20 p.
Daley, Final Office Action Feb. 17, 2011, U.S. Appl. No. 11/039,000, Jan. 18, 2005, 15 p.
Daley, Office Action Aug. 30, 2010, U.S. Appl. No. 11/039,000, Jan. 18, 2005, 15 p.
Daley, Final Office Action Nov. 27, 2009, U.S. Appl. No. 11/039,000, Jan. 18, 2005, 14 p.
Daley, Office Action May 28, 2009, U.S. Appl. No. 11/039,000, Jan. 18, 2005, 13 p.
Daley, Final Office Action Dec. 3, 2008, U.S. Appl. No. 11/039,000, Jan. 18, 2005, 15 p.
Daley, Office Action Jun. 5, 2008, U.S. Appl. No. 11/039,000, Jan. 18, 2005, 25 p.
Kapadekar, Examiner's Answer Mar. 2, 2011, U.S. Appl. No. 11/552,942, Oct. 25, 2006, 18 p.
Kapadekar, Final Office Action Jun. 11, 2010, U.S. Appl. No. 11/552,942, Oct. 25, 2006, 17 p.
Kapadekar, Office Action Oct. 30, 2009, U.S. Appl. No. 11/552,942, Oct. 25, 2006, 15 p.
Kapadekar, Final Office Action Jul. 24, 2009, U.S. Appl. No. 11/552,942, Oct. 25, 2006, 12 p.
Kapadekar, Office Action Jan. 14, 2009, U.S. Appl. No. 11/552,942, Oct. 25, 2006, 8 p.
Logan, Examiner's Answer Jul. 28, 2011, U.S. Appl. No. 11/500,734, Aug. 7, 2006, 2 p.
Logan, Examiner's Answer Jun. 28, 2011, U.S. Appl. No. 11/500,734, Aug. 7, 2006, 25 p.
Logan, Advisory Action Feb. 17, 2011, U.S. Appl. No. 11/500,734, Aug. 7, 2006, 2 p.
Logan, Office Action Sep. 29, 2010, U.S. Appl. No. 11/500,734, Aug. 7, 2006, 24 p.
Logan, Office Action Apr. 27, 2010, U.S. Appl. No. 11/500,734, Aug. 7, 2006, 23 p.
Logan, Final Office Action Dec. 14, 2009, U.S. Appl. No. 11/500,734, Aug. 7, 2006, 22 p.
Logan, Office Action Nov. 26, 2008, U.S. Appl. No. 11/500,734, Aug. 7, 2006, 20 p.
Rao, Examiner's Answer Jun. 28, 2011, U.S. Appl. No. 11/385,502, Mar. 21, 2006, 17 p.
Rao, Final Office Action Nov. 26, 2010, U.S. Appl. No. 11/385,502, Mar. 21, 2006, 11 p.
Rao, Office Action Jun. 25, 2010, U.S. Appl. No. 11/385,502, Mar. 21, 2006, 10 p.
Rao, Final Office Action Dec. 15, 2009, U.S. Appl. No. 11/385,502, Mar. 21, 2006, 10 p.
Rao, Office Action May 12, 2009, U.S. Appl. No. 11/385,502, Mar. 21, 2006, 9 p.
Motta, Final Office Action Nov. 19, 2012, U.S. Appl. No. 11/449,259, Jun. 7, 2006, 25 p.
Motta, Office Action Jul. 26, 2012, U.S. Appl. No. 11/449,259, Jun. 7, 2006, 20 p.
Motta, Decision on Appeal Jun. 20, 2012, U.S. Appl. No. 11/449,259, Jun. 7, 2006, 7 p.
Motta, Examiner's Answer Jul. 23, 2009, U.S. Appl. No. 11/449,259, Jun. 7, 2006, 28 p.
Motta, Interview Summary Feb. 12, 2009, U.S. Appl. No. 11/449,259, Jun. 7, 2006, 4 p.
Motta, Advisory Action Jan. 27, 2009, U.S. Appl. No. 11/449,259, Jun. 7, 2006, 3 p.
Motta, Final Office Action Nov. 13, 2008, U.S. Appl. No. 11/449,259, Jun. 7, 2006, 18 p.
Motta, Office Action Jul. 10, 2008, U.S. Appl. No. 11/449,259, Jun. 7, 2006, 22 p.
Motta, Examiner's Answer Nov. 25, 2011, U.S. Appl. No. 11/590,137, Oct. 30, 2006, 11 p.
Motta, Final Office Action Jul. 19, 2011, U.S. Appl. No. 11/590,137, Oct. 30, 2006, 11 p.
Motta, Office Action Mar. 11, 2011, U.S. Appl. No. 11/590,137, Oct. 30, 2006, 12 p.
Daley, Final Office Action Mar. 17, 2011, U.S. Appl. No. 11/676,997, Feb. 20, 2007, 34 p.
Daley, Office Action Aug. 17, 2010, U.S. Appl. No. 11/676,997, Feb. 20, 2007, 31 p.
Daley, Office Action Feb. 22, 2010, U.S. Appl. No. 11/676,997, Feb. 20, 2007, 27 p.
Motta, Interview Summary Apr. 12, 2012, U.S. Appl. No. 11/829,520, Jul. 27, 2007, 3 p.
Motta, Final Office Action Jan. 13, 2012, U.S. Appl. No. 11/829,520, Jul. 27, 2007, 27 p.
Motta, Interview Summary Nov. 29, 2011, U.S. Appl. No. 11/829,520, Jul. 27, 2007, 3 p.
Motta, Office Action Sep. 1, 2011, U.S. Appl. No. 11/829,520, Jul. 27, 2007, 14 p.
Daley, Examiner's Answer Nov. 2, 2010, U.S. Appl. No. 11/839,396, Aug. 15, 2007, 15 p.
Daley, Final Office Action May 25, 2010, U.S. Appl. No. 11/839,396, Aug. 15, 2007, 16 p.
Daley, Interview Summary Feb. 25, 2010, U.S. Appl. No. 11/839,396, Aug. 15, 2007, 3 p.
Daley, Office Action Dec. 21, 2009, U.S. Appl. No. 11/839,396, Aug. 15, 2007, 14 p.
Daley, Office Action Jul. 29, 2009, U.S. Appl. No. 11/839,396, Aug. 15, 2007, 23 p.
Rao, Final Office Action Sep. 21, 2012, U.S. Appl. No. 11/867,370, Oct. 4, 2007, 14 p.
Rao, Office Action May 3, 2012, U.S. Appl. No. 11/867,370, Oct. 4, 2007, 13 p.
Rao, Final Office Action Dec. 22, 2010, U.S. Appl. No. 11/867,370, Oct. 4, 2007, 10 p.
Rao, Office Action Sep. 3, 2010, U.S. Appl. No. 11/867,370, Oct. 4, 2007, 11 p.
Rao, Examiner's Answer Apr. 12, 2012, U.S. Appl. No. 11/871,867, Oct. 12, 2007, 14 p.
Rao, Final Office Action Oct. 11, 2011, U.S. Appl. No. 11/871,867, Oct. 12, 2007, 14 p.
Rao, Interview Summary Aug. 5, 2011, U.S. Appl. No. 11/871,867, Oct. 12, 2007, 4 p.
Rao, Office Action Apr. 29, 2011, U.S. Appl. No. 11/871,867, Oct. 12, 2007, 13 p.
Rao, Final Office Action Sep. 20, 2010, U.S. Appl. No. 11/871,867, Oct. 12, 2007, 14 p.
Rao, Office Action Mar. 25, 2010, U.S. Appl. No. 11/871,867, Oct. 12, 2007, 11 p.
Rao, Office Action Aug. 10, 2009, U.S. Appl. No. 11/871,867, Oct. 12, 2007, 14 p.

Chowdhary, Decision on Appeal Nov. 1, 2012, U.S. Appl. No. 11/005,312, Dec. 6, 2004, 8 p.
Chowdhary, Order Apr. 27, 2009, U.S. Appl. No. 11/005,312, Dec. 6, 2004, 3 p.
Chowdhary, Examiner's Answer Aug. 20, 2008, U.S. Appl. No. 11/005,312, Dec. 6, 2004, 28 p.
Chowdhary, Office Action Sep. 5, 2006, Nov. 1, 2012, U.S. Appl. No. 11/005,312, Dec. 6, 2004, 29 p.
Chowdhary, Final Office Action Mar. 21, 2007, U.S. Appl. No. 11/005,312, Dec. 6, 2004, 27 p.
Chowdhary, Office Action Jan. 11, 2008, U.S. Appl. No. 11/005,312, Dec. 6, 2004, 24 p.
Rao, Final Office Action Oct. 16, 2012, U.S. Appl. No. 13/350,355, Jan. 13, 2012, 18 p.
Rao, Office Action May 16, 2012, U.S. Appl. No. 13/350,355, Jan. 13, 2012, 28 p.
Okkonen, Office Action Dec. 28, 2005, U.S. Appl. No. 10/417,285, Apr. 15, 2003, 21 p.
Okkonen, Final Office Action May 1, 2006, U.S. Appl. No. 10/417,285, Apr. 15, 2003, 41 p.
Okkonen, Office Action Jan. 29, 2007, U.S. Appl. No. 10/417,285, Apr. 15, 2003, 41 p.
Okkonen, Office Action Aug. 6, 2007, U.S. Appl. No. 10/417,285, Apr. 15, 2003, 6 p.
Okkonen, Office Action Dec. 9, 2009, U.S. Appl. No. 11/650,777, Jan. 8, 2007, 17 p.
Okkonen, Final Office Action May 13, 2010, U.S. Appl. No. 11/650,777, Jan. 8, 2007, 24 p.
O'Neill, Office Action Jun. 26, 2006, U.S. Appl. No. 10/631,567, Jul. 31, 2003, 18 p.
O'Neill, Final Office Action Apr. 10, 2007, U.S. Appl. No. 10/631,567, Jul. 31, 2003, 31 p.
O'Neill, Office Action Jan. 14, 2008, U.S. Appl. No. 10/631,567, Jul. 31, 2003, 41 p.
O'Neill, Office Action Jul. 9, 2008, U.S. Appl. No. 10/631,567, Jul. 31, 2003, 14 p.
O'Neill, Final Office Action Jan. 22, 2009, U.S. Appl. No. 10/631,567, Jul. 31, 2003, 14 p.
Chen, Office Action Jan. 8, 2007, U.S. Appl. No. 10/646,324, Aug. 22, 2003, 9 p.
Chen, Office Action May 13, 2011, U.S. Appl. No. 11/923,383, Oct. 24, 2007, 22 p.
Chen, Final Office Action Nov. 10, 2011, U.S. Appl. No. 11/923,383, Oct. 24, 2007, 27 p.
O'Neill, Office Action Oct. 23, 2006, U.S. Appl. No. 10/654,149, Sep. 3, 2003, 13 p.
O'Neill, Office Action May 31, 2007, U.S. Appl. No. 10/654,149, Sep. 3, 2003, 13 p.
O'Neill, Final Office Action Dec. 13, 2007, U.S. Appl. No. 10/654,149, Sep. 3, 2003, 15 p.
O'Neill, Office Action Dec. 4, 2008, U.S. Appl. No. 10/654,149, Sep. 3, 2003, 14 p.
O'Neill, Final Office Action May 26, 2009, U.S. Appl. No. 10/654,149, Sep. 3, 2003, 15 p.
Rao, Office Action Feb. 7, 2007, U.S. Appl. No. 10/654,412, Sep. 3, 2003, 9 p.
Rao, Final Office Action Aug. 24, 2007, U.S. Appl. No. 10/654,412, Sep. 3, 2003, 13 p.
Rao, Office Action May 5, 2008, U.S. Appl. No. 10/654,412, Sep. 3, 2003, 15 p.
Chen, Office Action Nov. 20, 2006, U.S. Appl. No. 10/646,319, Aug. 22, 2003, 8 p.
Chen, Office Action Aug. 16, 2011, U.S. Appl. No. 12/032,809, Feb. 18, 2008, 20 p.
Chen, Final Office Action Jan. 19, 2012, U.S. Appl. No. 12/032,809, Feb. 18, 2008, 24 p.
Rao, Office Action Aug. 16, 2006, U.S. Appl. No. 10/695,713, Oct. 29, 2003, 12 p.
Rao, Final Office Action Dec. 20, 2006, U.S. Appl. No. 10/695,713, Oct. 29, 2003, 13 p.
Rao, Office Action Oct. 21, 2009, U.S. Appl. No. 11/688,820, Mar. 20, 2007, 10 p.
Rao, Final Office Action May 3, 2010, U.S. Appl. No. 11/688,820, Mar. 20, 2007, 14 p.
Rao, Office Action Dec. 30, 2004, U.S. Appl. No. 10/689,309, Oct. 20, 2003, 5 p.
Rao, Office Action Jun. 24, 2009, U.S. Appl. No. 11/251,046, Oct. 14, 2005, 8 p.
Lilley, Office Action Oct. 24, 2006, U.S. Appl. No. 10/681,861, Oct. 8, 2003, 24 p.
Lilley, Final Office Action Jul. 23, 2007, U.S. Appl. No. 10/681,861, Oct. 8, 2003, 18 p.
Lilley, Office Action Nov. 16, 2007, U.S. Appl. No. 10/681,861, Oct. 8, 2003, 18 p.
Lilley, Final Office Action Jun. 16, 2008, U.S. Appl. No. 10/681,861, Oct. 8, 2003, 24 p.
O'Neill, Office Action Mar. 22, 2007, U.S. Appl. No. 10/721,658, Nov. 25, 2003, 14 p.
O'Neill, Final Office Action Sep. 25, 2007, U.S. Appl. No. 10/721,658, Nov. 25, 2003, 9 p.
O'Neill, Final Office Action Feb. 20, 2008, U.S. Appl. No. 10/721,658, Nov. 25, 2003, 13 p.
Rao, Office Action Oct. 5, 2004, U.S. Appl. No. 10/701,848, Nov. 5, 2003, 12 p.
Rao, Final Office Action May 5, 2005, U.S. Appl. No. 10/701,848, Nov. 5, 2003, 14 p.
Rao, Office Action Nov. 23, 2005, U.S. Appl. No. 10/701,848, Nov. 5, 2003, 13 p.
Rao, Final Office Action Aug. 15, 2006, U.S. Appl. No. 10/701,848, Nov. 5, 2003, 16 p.
Rao, Office Action Nov. 14, 2006, U.S. Appl. No. 10/706,219, Nov. 12, 2003, 12 p.
Rao, Final Office Action May 2, 2007, U.S. Appl. No. 10/706,219, Nov. 12, 2003, 17 p.
Rao, Office Action Dec. 13, 2007, U.S. Appl. No. 10/706,219, Nov. 12, 2003, 13 p.
Rao, Office Action Jun. 25, 2008, U.S. Appl. No. 10/706,219, Nov. 12, 2003, 10 p.
Rao, Final Office Action Jan. 6, 2009, U.S. Appl. No. 10/706,219, Nov. 12, 2003, 16 p.
Rao, Office Action Jul. 22, 2009, U.S. Appl. No. 10/706,219, Nov. 12, 2003, 6 p.
Rao, Office Action Mar. 26, 2009, U.S. Appl. No. 11/401,708, Apr. 11, 2006, 20 p.
Rao, Office Action Aug. 9, 2005, U.S. Appl. No. 10/695,524, Oct. 28, 2003, 19 p.
Chia, Office Action May 28, 2008, U.S. Appl. No. 10/719,114, Nov. 21, 2003, 10 p.
Chia, Final Office Action Dec. 2, 2008, U.S. Appl. No. 10/719,114, Nov. 21, 2003, 8 p.
Chia, Final Office Action May 4, 2009, U.S. Appl. No. 10/719,114, Nov. 21, 2003, 11 p.
Chia, Office Action Aug. 19, 2009, U.S. Appl. No. 10/719,114, Nov. 21, 2003, 8 p.
Chia, Final Office Action Mar. 17, 2010, U.S. Appl. No. 10/719,114, Nov. 21, 2003, 9 p.
Jacobi, Office Action Dec. 10, 2004, U.S. Appl. No. 10/697,458, Oct. 30, 2003, 16 p.
Jacobi, Final Office Action Jun. 14, 2005, U.S. Appl. No. 10/697,458, Oct. 30, 2003, 16 p.
Gustafson, Office Action Mar. 4, 2008, U.S. Appl. No. 10/761,735, Jan. 20, 2004, 25 p.
Gustafson, Office Action Sep. 8, 2008, U.S. Appl. No. 10/761,735, Jan. 20, 2004, 25 p.
Gustafson, Final Office Action Mar. 20, 2009, U.S. Appl. No. 10/761,735, Jan. 20, 2004, 27 p.
Rao, Office Action Sep. 25, 2008, U.S. Appl. No. 11/083,596, Mar. 18, 2005, 7 p.
Rao, Office Action Oct. 19, 2004, U.S. Appl. No. 10/765,817, Jan. 27, 2004, 8 p.
Rao, Office Action Feb. 4, 2008, U.S. Appl. No. 10/782,083, Feb. 19, 2004, 21 p.
Rao, Final Office Action Jul. 15, 2008, U.S. Appl. No. 10/782,083, Feb. 19, 2004, 25 p.

Gustafson, Office Action Jul. 24, 2007, U.S. Appl. No. 10/790,340, Mar. 1, 2004, 21 p.
Gustafson, Office Action Jun. 12, 2008, U.S. Appl. No. 10/790,340, Mar. 1, 2004, 20 p.
Gustafson, Office Action Dec. 23, 2008, U.S. Appl. No. 10/790,340, Mar. 1, 2004, 21 p.
Gustafson, Final Office Action Jul. 6, 2009, U.S. Appl. No. 10/790,340, Mar. 1, 2004, 21 p.
Lilley, Final Office Action Jul. 25, 2007, U.S. Appl. No. 10/646,975, Aug. 22, 2003, 13 p.
Lilley, Office Action Oct. 31, 2007, U.S. Appl. No. 10/646,975, Aug. 22, 2003, 15 p.
Lilley, Final Office Action Apr. 16, 2008, U.S. Appl. No. 10/646,975, Aug. 22, 2003, 14 p.
Rao, Office Action Jun. 30, 2006, U.S. Appl. No. 10/797,176, Mar. 10, 2004, 15 p.
Rao, Final Office Action Jul. 17, 2007, U.S. Appl. No. 10/797,176, Mar. 10, 2004, 26 p.
Rao, Final Office Action Oct. 31, 2007, U.S. Appl. No. 10/797,176, Mar. 10, 2004, 29 p.
Rao, Office Action Apr. 14, 2008, U.S. Appl. No. 10/797,176, Mar. 10, 2004, 31p.
Rao, Office Action Oct. 16, 2008, U.S. Appl. No. 10/797,176, Mar. 10, 2004, 33 p.
Rao, Final Office Action Nov. 25, 2009, U.S. Appl. No. 10/797,176, Mar. 10, 2004, 41 p.
Rao, Final Office Action Aug. 19, 2010, U.S. Appl. No. 10/797,176, Mar. 10, 2004, 5 p.
Okkonnen, Office Action Feb. 28, 2005, U.S. Appl. No. 10/807,694, Mar. 24, 2004, 18 p.
Okkonnen, Final Office Action Aug. 10, 2005, U.S. Appl. No. 10/807,694, Mar. 24, 2004, 17 p.
Okkonen, Office Action Mar. 14, 2006, U.S. Appl. No. 10/807,694, Mar. 24, 2004, 21 p.
Okkonen, Office Action Oct. 24, 2006, U.S. Appl. No. 10/807,694, Mar. 24, 2004, 16 p.
Okkonen, Office Action Jul. 10, 2007, U.S. Appl. No. 10/807,694, Mar. 24, 2004, 19 p.
Okkonen, Final Office Action Dec. 18, 2007, U.S. Appl. No. 10/807,694, 03/64/04, 22 p.
Okkonen, Office Action May 12, 2008, U.S. Appl. No. 10/807,694, Mar. 24, 2004, 22 p.
Okkonen, Final Office Action Nov. 20, 2008, U.S. Appl. No. 10/807,694, Mar. 24, 2004, 22 p.
Okkonen, Office Action Jun. 25, 2009, U.S. Appl. No. 10/807,694, Mar. 24, 2004, 34 p.
McGhee, Office Action Sep. 27, 2006, U.S. Appl. No. 10/797,825, Mar. 10, 2004, 7 p.
McGhee, Final Office Action Jun. 25, 2007, U.S. Appl. No. 10/797,825, Mar. 10, 2004, 6 p.
Yang, Office Action Jan. 28, 2008, U.S. Appl. No. 10/802,191, Mar. 17, 2004, 18 p.
Yang, Final Office Action Jun. 6, 2008, U.S. Appl. No. 10/802,191, Mar. 17, 2004, 19 p.
Yang, Office Action Sep. 5, 2008, U.S. Appl. No. 10/802,191, Mar. 17, 2004, 16 p.
Qumei, Final Office Action Nov. 23, 2007, U.S. Appl. No. 10/813,212, Mar. 30, 2004, 11 p.
Yang, Office Action Sep. 21, 2006, U.S. Appl. No. 10/635,991, Aug. 7, 2003, 10 p.
Yang, Office Action Jun. 6, 2010, U.S. Appl. No. 12/014,549, Jan. 15, 2008, 8 p.
Yang, Final Office Action Sep. 16, 2010, U.S. Appl. No. 12/014,549, Jan. 15, 2008, 7 p.
Yang, Office Action Nov. 2, 2006, U.S. Appl. No. 10/887,490, Jul. 8, 2004, 12 p.
Yang, Final Office Action Apr. 17, 2007, U.S. Appl. No. 10/887,490, Jul. 8, 2004, 13 p.
Marolia, Final Office Action Jan. 30, 2008, U.S. Appl. No. 10/852,396, May 24, 2004, 17 p.
Marolia, Office Action May 28, 2008, U.S. Appl. No. 10/852,396, May 24, 2004, 20 p.
Marolia, Office Action Dec. 8, 2008, U.S. Appl. No. 10/852,396, May 24, 2004, 19 p.
Marolia, Final Office Action Jun. 17, 2009, 10/852,396, May 24, 2004, 24 p.
Marolia, Office Action Dec. 14, 2009, U.S. Appl. No. 10/852,396, May 24, 2004, 19 p.
Marolia, Office Action Jun. 3, 2005, U.S. Appl. No. 10/888,841, Jul. 9, 2004, 8 p.
Marolia, Final Office Action Dec. 6, 2005, U.S. Appl. No. 10/888,841, Jul. 9, 2004, 10 p.
Marolia, Office Action May 4, 2006, U.S. Appl. No. 10/888,841, Jul. 9, 2004, 13 p.
Marolia, Final Office Action Jan. 12, 2007, U.S. Appl. No. 10/888,841, Jul. 9, 2004, 15 p.
Marolia, Office Action Jun. 18, 2007, U.S. Appl. No. 10/888,841, Jul. 9, 2004, 16 p.
Marolia, Final Office Action Nov. 27, 2007, U.S. Appl. No. 10/888,841, Jul. 9, 2004, 17 p.
Marolia, Office Action Apr. 28, 2009, U.S. Appl. No. 10/888,841, Jul. 9, 2004, 15 p.
Qumei, Office Action Apr. 21, 2008, U.S. Appl. No. 10/864,095, Jun. 9, 2004, 15 p.
Marolia, Office Action Dec. 11, 2007, U.S. Appl. No. 10/879,869, Jun. 28, 2004, 10 p.
Marolia, Final Office Action May 30, 2008, U.S. Appl. No. 10/879,869, Jun. 28, 2004, 15 p.
Marolia, Office Action Aug. 18, 2008, U.S. Appl. No. 10/879,869, Jun. 28, 2004, 17 p.
Marolia, Final Office Action Jan. 28, 2009, U.S. Appl. No. 10/879,869, Jun. 28, 2004, 18 p.
Rao, Office Action Jul. 25, 2007, U.S. Appl. No. 10/860,964, Jun. 4, 2004, 22 p.
Rao, Final Office Action Jan. 7, 2008, U.S. Appl. No. 10/860,964, Jun. 4, 2004, 26 p.
Rao, Office Action Apr. 30, 2008, U.S. Appl. No. 10/860,964, Jun. 4, 2004, 23 p.
Rao, Final Office Action Oct. 28, 2008, U.S. Appl. No. 10/860,964, Jun. 4, 2004, 29 p.
Yang, Office Action Jun. 27, 2007, U.S. Appl. No. 10/860,978, Jun. 4, 2004, 14 p.
Yang, Final Office Action Dec. 7, 2007, U.S. Appl. No. 10/860,978, Jun. 4, 2004, 16 p.
Yang, Office Action Jun. 20, 2008, U.S. Appl. No. 10/860,978, Jun. 4, 2004, 13 p.
Yang, Office Action Dec. 23, 2008, U.S. Appl. No. 10/860,978, Jun. 4, 2004, 13 p.
Yang, Final Office Action Jun. 19, 2009, U.S. Appl. No. 10/860,978, Jun. 4, 2004, 16 p.
Rao, Office Action Aug. 24, 2007, U.S. Appl. No. 10/868,050, Jun. 15, 2004, 15 p.
Rao, Office Action Feb. 4, 2008, U.S. Appl. No. 10/868,050, Jun. 15, 2004, 16 p.
Rao, Final Office Action Aug. 6, 2008, U.S. Appl. No. 10/868,050, Jun. 15, 2004, 18 p.
Rao, Office Action Apr. 15, 2008, U.S. Appl. No. 10/899,513, Jul. 26, 2004, 14 p.
Rao, Final Office Action Oct. 24, 2008, U.S. Appl. No. 10/899,513, Jul. 26, 2004, 16 p.
Rao, Office Action Jun. 11, 2007, U.S. Appl. No. 10/902,452, Jul. 29, 2004, 13 p.
Rao, Final Office Action Dec. 20, 2007, U.S. Appl. No. 10/902,452, Jul. 29, 2004, 10 p.
Rao, Final Office Action Jun. 23, 2008, U.S. Appl. No. 10/902,425, Jul. 29, 2004, 14 p.
Rao, Office Action Jan. 5, 2009, U.S. Appl. No. 10/902,452, Jul. 29, 2004, 16 p.
Rao, Final Office Action Jul. 20, 2009, U.S. Appl. No. 10/902,452, Jul. 29, 2004, 16 p.
Rao, Office Action May 13, 2010, U.S. Appl. No. 10/902,452, Jul. 29, 2004, 16 p.
Qumei, Office Action Jul. 12, 2007, U.S. Appl. No. 10/909,519, Aug. 2, 2004, 17 p.

Qumei, Final Office Action Dec. 20, 2007, U.S. Appl. No. 10/909,519, Aug. 2, 2004, 11 p.
Qumei, Office Action May 29, 2008, U.S. Appl. No. 10/909,519, Aug. 2, 2004, 21 p.
Qumei, Final Office Action Nov. 17, 2008, U.S. Appl. No. 10/909,519, Aug. 2, 2004, 24 p.
Qumei, Office Action Apr. 28, 2009, U.S. Appl. No. 10/909,519, Aug. 2, 2004, 23 p.
Chen, Office Action May 14, 2008, U.S. Appl. No. 10/932,175, Sep. 1, 2004, 18 p.
Chen, Final Office Action Feb. 6, 2009, U.S. Appl. No. 10/932,175, Sep. 1, 2004, 15 p.
Chen, Office Action Mar. 1, 2010, U.S. Appl. No. 10/932,175, Sep. 1, 2004, 16 p.
Chen, Final Office Action Sep. 21, 2010, U.S. Appl. No. 10/932,175, Sep. 1, 2004, 17 p.
Okkonen, Office Action Jan. 5, 2007, U.S. Appl. No. 10/945,466, Sep. 20, 2004, 5 p.
Okkonen, Office Action Aug. 10, 2007, U.S. Appl. No. 10/945,466, Sep. 20, 2004, 5 p.
Okkonen, Final Office Action Jan. 9, 2008, U.S. Appl. No. 10/945,466, Sep. 20, 2004, 7 p.
Okkonen, Office Action May 12, 2008, U.S. Appl. No. 10/945,466, Sep. 20, 2004, 6 p.
Okkonen, Office Action Nov. 12, 2008, U.S. Appl. No. 10/945,466, Sep. 20, 2004, 5 p.
Okkonen, Office Action Apr. 14, 2009, U.S. Appl. No. 10/945,466, Sep. 20, 2004, 5 p.
Rao, Office Action Aug. 27, 2007, U.S. Appl. No. 10/950,764, Sep. 27, 2004, 14 p.
Rao, Final Office Action Mar. 4, 2008, U.S. Appl. No. 10/950,746, Sep. 27, 2004, 17 p.
Rao, Office Action Nov. 3, 2008, U.S. Appl. No. 10/950,764, Sep. 27, 2004, 12 p.
Rao, Final Office Action Jun. 30, 2009, U.S. Appl. No. 10/950,764, Sep. 27, 2004, 15 p.
Chen, Office Action Jan. 29, 2008, U.S. Appl. No. 10/958,148, Oct. 4, 2004, 16 p.
Chen, Final Office Action Aug. 20, 2008, U.S. Appl. No. 10/958,148, Oct. 4, 2004, 19 p.
Chen, Office Action Apr. 14, 2009, U.S. Appl. No. 10/958,148, Oct. 4, 2004, 11 p.
Chen, Final Office Action Nov. 25, 2009, U.S. Appl. No. 10/958,148, Oct. 4, 2004, 12 p.
Chen, Office Action Apr. 1, 2010, U.S. Appl. No. 10/958,148, Oct. 4, 2004, 13 p.
Gustafson, Office Action Sep. 11, 2007, U.S. Appl. No. 11/010,913, Dec. 13, 2004, 27 p.
Gustafson, Office Action Feb. 1, 2008, U.S. Appl. No. 11/010,913, Dec. 13, 2004, 29 p.
Gustafson, Final Office Action Feb. 18, 2010, U.S. Appl. No. 11/010,913, Dec. 13, 2004, 31 p.
Ren, Office Action Jan. 22, 2008, U.S. Appl. No. 10/989,628, Nov. 16, 2004, 8 p.
Ren, Office Action Aug. 18, 2008, U.S. Appl. No. 10/989,628, Nov. 16, 2004, 7 p.
Ren, Final Office Action Nov. 24, 2009, U.S. Appl. No. 10/989,628, Nov. 16, 2004, 9 p.
Slyz, Office Action Mar. 1, 2010, U.S. Appl. No. 11/874,102, Oct. 17, 2007, 13 p.
Qumei, Office Action Apr. 9, 2007, U.S. Appl. No. 10/698,665, Oct. 30, 2003, 22 p.
Qumei, Office Action Jul. 29, 2010, U.S. Appl. No. 11/852,933, Sep. 10, 2007, 14 p.
Qumei, Final Office Action Feb. 17, 2011, U.S. Appl. No. 11/852,933, Sep. 10, 2007, 19 p.
Chen, Office Action Apr. 19, 2007, U.S. Appl. No. 10/903,394, Jul. 30, 2004, 31 p.
Chen, Final Office Action Oct. 18, 2007, U.S. Appl. No. 10/903,394, Jul. 30, 2004, 34 p.
Chen, Office Action May 13, 2008, U.S. Appl. No. 10/903,394, Jul. 30, 2004, 14 p.
Chen, Office Action Nov. 26, 2008, U.S. Appl. No. 10/903,394, Jul. 30, 2004, 14 p.
Chen, Final Office Action Apr. 21, 2009, U.S. Appl. No. 10/903,394, Jul. 30, 2004, 21 p.
Chen, Office Action Oct. 30, 2009, U.S. Appl. No. 10/903,394, Jul. 30, 2004, 19 p.
Chen, Final Office Action Apr. 29, 2010, U.S. Appl. No. 10/903,394, Jul. 30, 2004, 24 p.
Rao, Office Action Feb. 4, 2008, U.S. Appl. No. 11/047,212, Jan. 31, 2005, 9 p.
Rao, Final Office Action Sep. 3, 2008, U.S. Appl. No. 11/047,212, Jan. 31, 2005, 8 p.
Rao, Office Action Feb. 2, 2009, U.S. Appl. No. 11/047,212, Jan. 31, 2005, 8 p.
Rao, Final Office Action Sep. 25, 2009, U.S. Appl. No. 11/047,212, Jan. 31, 2005, 9 p.
Rao, Office Action Jan. 22, 2010, U.S. Appl. No. 11/047,212, Jan. 31, 2005, 9 p.
Rao, Final Office Action Jun. 10, 2010, U.S. Appl. No. 11/047,212, Jan. 31, 2005, 11 p.
Rao, Office Action Jan. 14, 2011, U.S. Appl. No. 11/047,212, Jan. 31, 2005, 9 p.
Kokkinen, Office Action Feb. 23, 2007, U.S. Appl. No. 10/688,640, Oct. 17, 2003, 23 p.
Kokkinen, Office Action Aug. 21, 2007, U.S. Appl. No. 10/688,640, Oct. 17, 2003, 23 p.
Kokkinen, Office Action Jul. 18, 2008, U.S. Appl. No. 10/688,640, Oct. 17, 2003, 28 p.
Kokkinen, Office Action Dec. 30, 2008, U.S. Appl. No. 10/688,640, Oct. 17, 2003, 29 p.
Kokkinen, Office Action Jul. 21, 2009, U.S. Appl. No. 10/688,640, Oct. 17, 2003, 30 p.
Kokkinen, Office Action Feb. 24, 2010, U.S. Appl. No. 10/688,640, Oct. 17, 2003, 33 p.
Kokkinen, Office Action Aug. 6, 2010, U.S. Appl. No. 10/688,640, Oct. 17, 2003, 26 p.
Okkonen, Office Action Apr. 19, 2007, U.S. Appl. No. 10/788,768, Feb. 27, 2004, 14 p.
Okkonen, Final Office Action Oct. 2, 2007, U.S. Appl. No. 10/788,768, Feb. 27, 2004, 18 p.
Okkonen, Office Action Mar. 20, 2008, U.S. Appl. No. 10/788,768, Feb. 27, 2004, 16 p.
Okkonen, Office Action Oct. 2, 2008, U.S. Appl. No. 10/788,768, Feb. 27, 2004, 17 p.
Okkonen, Final Office Action Apr. 14, 2009, U.S. Appl. No. 10/788,768, Feb. 27, 2004, 18 p.
Qumei, Final Office Action Sep. 7, 2007, U.S. Appl. No. 10/770,983, Feb. 3, 2004, 15 p.
Qumei, Office Action Jan. 25, 2008, U.S. Appl. No. 10/770,983, Feb. 3, 2004, 18 p.
Qumei, Office Action Jul. 3, 2008, U.S. Appl. No. 10/770,983, Feb. 3, 2004, 22 p.
Qumei, Office Action Dec. 19, 2008, U.S. Appl. No. 10/770,983, Feb. 3, 2004, 19 p.
Qumei, Final Office Action Jun. 11, 2009, U.S. Appl. No. 10/770,983, Feb. 3, 2004, 21 p.
Hamasaki, Office Action Jan. 9, 2008, U.S. Appl. No. 10/748,053, Dec. 30, 2003, 18 p.
Hamasaki, Final Office Action Aug. 20, 2008, U.S. Appl. No. 10/748,053, Dec. 30, 2003, 21 p.
Hamasaki, Office Action Feb. 27, 2009, U.S. Appl. No. 10/748,053, Dec. 30, 2003, 19 p.
Hamasaki, Final Office Action Sep. 11, 2009, U.S. Appl. No. 10/748,053, Dec. 30, 2003, 19 p.
Hamasaki, Final Office Action May 17, 2010, U.S. Appl. No. 10/748,053, Dec. 30, 2003, 21 p.
Rao, Office Action Feb. 6, 2009, U.S. Appl. No. 10/754,378, Jan. 9, 2004, 14 p.
Rao, Final Office Action Jul. 13, 2009, U.S. Appl. No. 10/754,378, Jan. 9, 2004, 25 p.
Rao, Office Action May 17, 2010, U.S. Appl. No. 10/754,378, Jan. 9, 2004, 43 p.

Marolia, Office Action Oct. 17, 2006, U.S. Appl. No. 10/754,313, Jan. 9, 2004, 16 p.
Marolia, Office Action Feb. 20, 2008, U.S. Appl. No. 10/754,313, Jan. 9, 2004, 11 p.
Gustafson, Office Action Jan. 4, 2007, U.S. Appl. No. 10/756,103, Jan. 13, 2004, 10 p.
Gustafson, Office Action Aug. 10, 2007, U.S. Appl. No. 10/756,103, Jan. 13, 2004, 11 p.
Gustafson, Office Action Jan. 22, 2008, U.S. Appl. No. 10/756,103, Jan. 13, 2004, 11 p.
Gustafson, Office Action Jul. 8, 2009, U.S. Appl. No. 10/756,103, Jan. 13, 2004, 21 p.
Gustafson, Final Office Action Dec. 18, 2009, U.S. Appl. No. 10/756,103, Jan. 13, 2004, 22 p.
Chen, Office Action Jul. 23, 2007, U.S. Appl. No. 10/646,230, Aug. 22, 2003, 14 p.
Chen, Final Office Action Dec. 28, 2007, U.S. Appl. No. 10/646,230, Aug. 22, 2003, 14 p.
Chen, Office Action Dec. 23, 2008, U.S. Appl. No. 10/646,230, Aug. 22, 2003, 25 p.
Chen, Final Office Action May 27, 2009, U.S. Appl. No. 10/646,230, Aug. 22, 2003, 28 p.
Chen, Office Action Dec. 2, 2009, U.S. Appl. No. 10/646,230, Aug. 22, 2003, 15 p.
Chen, Office Action May 27, 2010, U.S. Appl. No. 10/646,230, Aug. 22, 2003, 17 p.
Chen, Final Office Action Nov. 10, 2010, U.S. Appl. No. 10/646,230, Aug. 22, 2003, 17 p.
Chen, Office Action Aug. 23, 2011, U.S. Appl. No. 10/646,230, Aug. 22, 2003, 6 p.
Marolia, Office Action Aug. 17, 2007, U.S. Appl. No. 10/852,396, May 24, 2004, 17 p.
Qumei, Office Action Jun. 20, 2007, U.S. Appl. No. 10/813,212, Mar. 30, 2004, 10 p.
Chen, Office Action Jun. 12, 2008, U.S. Appl. No. 10/646,230, Aug. 22, 2003, 14 p.
Chen, Office Action Dec. 7, 2005, U.S. Appl. No. 10/411,784, Apr. 4, 2003, 15 p.
Chen, Final Office Action Nov. 6, 2007, U.S. Appl. No. 11/125,974, May 9, 2005, 10 p.
Gustafson, Office Action Jan. 22, 2009, U.S. Appl. No. 10/756,103, Jan. 13, 2004, 15.p.
Qumei, Office Action, Apr. 13, 2007, U.S. Appl. No. 10/770,983, Feb. 3, 2004, 11 .p.
Muller, N. J., "Focus on OpenView a guide to Hewlett-Packard's Network and Systems Management Platform," pp. 1-291, CBM Books, published 1995.
ILOG, "ILOG Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] <http://delivery.acm.org/1 0.1145/350000/34464 7/p303-verbauwhede. pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.
Bailey, E. C., "Maximum RPM: Taking the Red Hat Package Manager to the Limit," Copyright 2000 by Red Hat, Inc., 14 p.
Baker et al., "Compressing Differences of Executable Code," Apr. 22, 1999.
Bokun et al. (Active Badges—The Next Generation, Linux Journa, Oct. 1998, Issue 54).

Brown, Michael et al., PGP in Constrined Wireless Devices, 1-23, 9th USENIX Security Symposium Paper 2000, retrieved Apr. 16, 2007.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.
Digital Cellular Telecomminications System (Phase 2+) AT Command Set for GSM Mobile Equipment (ME) (GSM 07.07 version 7.4.0 Release 1998), MI TS 100 916 V7.4.0 (Nov. 1999), 126 p.
Engstrom, Don, "Two Clicks to a Rejuvenated Mac: A Review of UpdateAgent—CD Edition," 20 Febuary 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/ Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE LAN Man Standards Committee, "Draft Amendment to IEEE Standard for Local and Metropolitan Area Networks; Part 16: Air Interface for Fixed and Mobile Broadband Wireless Access Systems—Amendment to IEE Standards for Local and Metoropolitian Area Networks—Management Plane Procedures and Services," IEEE Draft Standards, No. 802. 16g-04/03, Dec. 2004, pp. 1-8, XP002469853.
Jansen et al., "APPROX 2000, LNCS 1913," pp. 84-95, 2000, Springer-Verlag, Berlin Heidelberg 2000.
Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.
Open Mobile Alliance, "Firmware Update Management Object," 2006.
Open Mobile Alliance, "OMA Device Management Security," Jul. 2005, Candidate Version 1.2.
Open Mobile Alliance, "SyncML Device Management Bootstrap," 2003.
Open Mobile Alliance, "Firmware Update Management Object," OMA-DM-V0_14-2004Oct28-D.
Open Mobile Alliance, "OMA Device Management Tree and Description_ver 1.2," Jun. 15, 2005 (OMA-TS-DM-TND-V1_2-20050615-C).
Paila et al. "FLUTE-File Delivery Over Unidirectional Transport," Network Working Group Request for Comments; 3926 Category; Experimental; Oct. 2004.
"Part 16: Air Interface for Fixed Broadband Wireless Access Systems," Sep. 22, 2005, pp. 1-257, XP007904329.
"Problem Tracking Task Reference," Continuus Software Corporation, Whole Manual, Part No. Pttr-041-011, 1996.
riel, "Object-Oriented Design Heuristics," Apr. 30, 1996, Addison-Wesley Professional, Section 10.1.
Rodriguez et al., "TCP/IP Tutorial and Technical Overview," Copyright 2002, pp. 489-490.
Shapira et al., "In Place Differential File Compression," The Author 2005; Published by Oxford University Press on behalf of the British Computer Society; Advance Access published on Aug. 26, 2005; 15 p.
Starlin, Mark, UpdateAgent 8, Nov. 19, 2002, pp. 1-2.
Symbian, "Symbian OS powered Sony Ericsson P800 Smartphone to ship in Q32003" Mar. 2002 pp. 1-2.
Tansley, "Linux and Unix Shell Programming," Dec. 27, 1999, Addison-Wesley Professional, 2 p.

The Mac Observer, Update Agent Scouts Out an Update for Itself, May 9, 2000, pp. 1-3.
TIA/EIA/IS-683-A: Over-the-Air Service Provisioning of Mobile Stations in Spread Spectrum Systems: May 1998.
Veeraraghavan et al., "A distributed control strategy for wireless ATM networks," pp. 323•339, Wireless Networks 1995, retrieved from ACM database search Jun. 15, 2006.

Yang et al. , "Reuse Linux Device Drivers in Embedded Systems," 1998 International Computer Symposium Workshop on Software Engineering and Database Systems Dec. 17-19, 1998.
Yau et al., "An approach to distributed component-based real-time application software development," 1998, pp. 275-283.

* cited by examiner

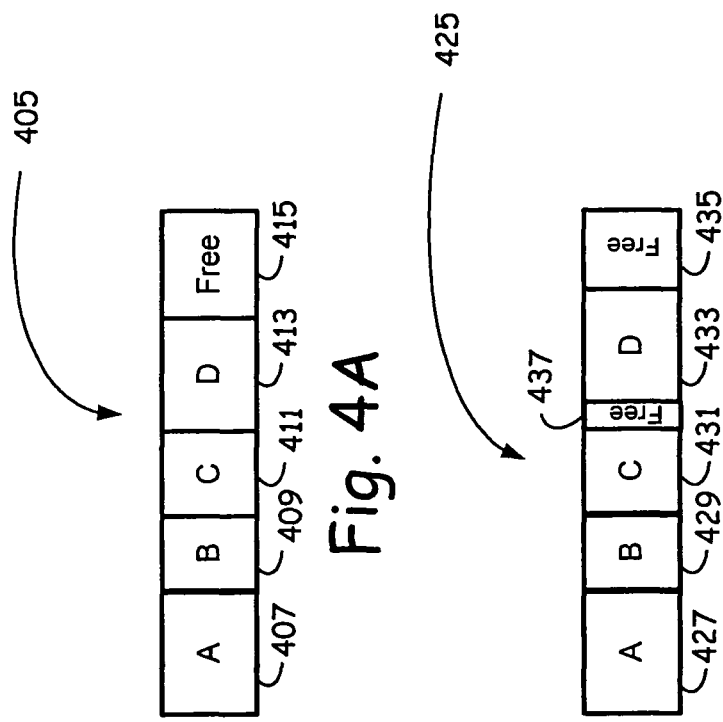

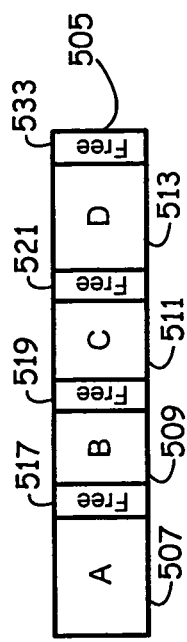
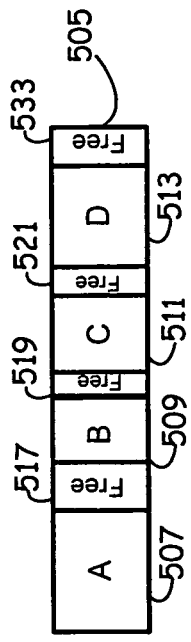
Fig. 5A
Fig. 5B

```
-o image.out
-m image.map

MEMORY {
   FLASH  (RX) : origin= 0x10000, length = 0x70000
   RAM   (RWXI): origin= 0x100000, length = 0x40000
}

SECTIONS
{
 .text   : load = FLASH
 .cinit  : load = FLASH
 .const  : load = FLASH
 .data   : load = FLASH
 .bss    : load = RAM
}
```

Fig. 6A

```
-o image.out
-m image.map

MEMORY {
    FLASH1 (RX) : origin= 0x10000, length = 0x10000
    FLASH2 (RX) : origin= 0x20000, length = 0x20000
    FLASH3 (RX) : origin= 0x40000, length = 0x20000
    FLASH4 (RX) : origin= 0x60000, length = 0x20000
    RAM   (RWXI): origin= 0x100000, length = 0x40000
}

SECTIONS
{

.rom1  : load = FLASH2
    {
      C:\TIMAP\Gaps\img1\TI\Release\uadebug.obj (.text, .data, .const, .cinit)
      C:\TIMAP\Gaps\img1\TI\Release\uadevice.obj (.text, .data, .const, .cinit)
      C:\TIMAP\Gaps\img1\TI\Release\uadeviceasm.obj (.text, .data, .const, .cinit)
    }

.rom2  : load = FLASH3
    {
      C:\TIMAP\Gaps\img1\TI\Release\uaflash.obj (.text, .data, .const, .cinit)
      C:\TIMAP\Gaps\img1\TI\Release\uainit.obj (.text, .data, .const, .cinit)
      C:\TIMAP\Gaps\img1\TI\Release\samson.obj (.text, .data, .const, .cinit)
      C:\TIMAP\Gaps\img1\TI\Release\link1.obj (.text, .data, .const, .cinit)
    }

.rom3  : load = FLASH4
    {
      C:\TIMAP\Gaps\img1\TI\Release\uamemory.obj (.text, .data, .const, .cinit)
      C:\TIMAP\Gaps\img1\TI\Release\uaui.obj (.text, .data, .const, .cinit)
      C:\TIMAP\Gaps\img1\TI\Release\uabootmem.obj (.text, .data, .const, .cinit)
      C:\TIMAP\Gaps\img1\TI\Release\link2.obj (.text, .data, .const, .cinit)
      C:\TIMAP\Gaps\img1\TI\Release\uistring.obj (.text, .data, .const, .cinit)
    }

.text  : load = FLASH1
    .cinit : load = FLASH1
    .const : load = FLASH1
    .data  : load = FLASH1
    .bss   : load = RAM
}
```

Fig. 6B

INITIALIZATION AND UPDATE OF SOFTWARE AND/OR FIRMWARE IN ELECTRONIC DEVICES

RELATED APPLICATIONS

This application is a continuation of U.S. patent application Ser. No. 10/411,784 titled "Initialization And Update Of Software And/Or Firmware In Electronic Devices", filed Apr. 11, 2003, which is a continuation-in-part of U.S. patent application Ser. No. 10/311,462, titled "System and Method for Updating and Distributing Information", filed May 13, 2003, and which makes reference to, claims benefit of, and claims priority to U.S. Provisional Patent Application Ser. No. 60/373,422 titled "Update Package Generation And Distribution Network", filed Apr. 12, 2002; U.S. Provisional Patent Application Ser. No. 60/373,421 titled "Pattern Detection Preprocessor In An Update Generation System", filed Apr. 12, 2002; U.S. Provisional Patent Application Ser. No. 60/373,423 titled "Layout Preprocessor In An Update Generation System", filed Apr. 12, 2002; and U.S. Provisional Patent Application Ser. No. 60/372,066 titled "Memory Initialization System For Initializing A Memory Image With A Pattern", filed Apr. 12, 2002. U.S. patent application Ser. No. 10/311,462 is the National Stage filing of PCT Application Ser. No. PCT/US01/44034, titled "System and Method for Updating and Distributing Information", filed Nov. 19, 2001, which claims priority to U.S. Provisional Patent Application Ser. No. 60/249,606, filed Nov. 17, 2000. The complete subject matter of each of the above is incorporated herein by reference in its entirety.

This application is also related to U.S. patent application Ser. No. 10/411,835 titled "Update Package Generation And Distribution Network", filed Apr. 11, 2003, and U.S. patent application Ser. No. 10/412,045 titled "Pattern Detection Preprocessor In An Electronic Device Update Generation System", filed Apr. 11, 2003, the complete subject matter of each of which is hereby incorporated by reference, in its entirety.

This application is also related to the following co-pending applications, each of which is hereby incorporated herein by reference in its entirety:

| Ser. No. | Title | Filed | Inventors |
| --- | --- | --- | --- |
| | Update Package Generation and Distribution Network | Apr. 11, 2003 | O'Neill Rao |
| | Pattern Detection Preprocessor in an Electronic Device Update Generation System | Apr. 11, 2003 | Chen O'Neill Rao Lilley |

FEDERALLY SPONSORED RESEARCH OR DEVELOPMENT

[Not Applicable]

MICROFICHE/COPYRIGHT REFERENCE

[Not Applicable]

TECHNICAL FIELD

The present invention relates generally to the process of updating software in electronic devices in general, and, more specifically, to the specification and subsequent execution of software update activities in such devices.

BACKGROUND OF THE INVENTION

Electronic devices such as mobile phones, personal digital assistants, pagers, and interactive digital appliances have become indispensable as a tool as the number of features and functions they provide increases. As technology continues to evolve, a manufacturer of such devices will find it imperative to update these devices with revised software that enables a number of new features and functions.

The term "software" used herein is intended to include not only software, but also or alternatively firmware. Similarly, the term "firmware" used herein is intended to include not only firmware, but also or alternatively software.

When existing software in memory of an electronic device must be updated as a result of a version upgrade, the new version of the software may require more memory space than the existing version. An attempt to replace the existing version with the new version by replacement with new software may cause a shifting or relocation of adjacent code not related to the application software. Such relocations require the modification of software code in order to provide continued operation of the updated feature or function. These modifications often involve re-compiling any software code that is affected by address references to the relocated code. As a result, the size of an update may be quite large. The effects of shifting and relocation of adjacent software code as a part of a software update may result in significant costs to a manufacturer. Furthermore, the time it takes to update a software may increase due to a large update size, and this provides an inconvenience to any user.

In order to perform a software update, it is important to evaluate the free memory space available should the update size occupy a larger space than the existing software. However, it is often difficult to assess the amount of free or unused memory available in an electronic device's memory because the free space may contain un-initialized random bit patterns. Free or unused memory in electronic devices provided by different manufacturers is usually not initialized, making it difficult to determine the location and size of any unused or free space. When performing updates of firmware in an electronic device, the amount of unused memory required for installation is often critical.

During a manufacturing cycle, a manufacturer typically burns copies of identical software modules for their devices. However, the unused or free space may not have a consistent binary pattern. As a result, any two similar devices with the same make and model may often end up with different memory (ROM, RAM or FLASH) snapshots or images. When attempting to determine the difference between versions of software resident in the memory of any two devices, any unused space in either memory that contains random un-initialized sequences makes it difficult to compare the two.

In the case of mobile handsets, the software that is often updated and stored in read-only memory (ROM) or programmable ROM (PROM) is called firmware. Firmware is often responsible for the behavior of a system when it is first switched on and is used to properly boot up a mobile handset when powered up. The unused memory space generated by a particular firmware image may be filled with a random sequence of binary data. This results in firmware images that are not necessarily consistent across handsets with the same firmware version. In comparing the firmware images from two different handsets of the same type, the firmware may appear to be significantly different from each other, when in reality they may be identical. As a result, it becomes a difficult task to easily identify the version of software loaded in an electronic device based on the image it presents. Further, it becomes difficult to determine whether a device requires an update.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system is provided to effectively update a software and/or firmware in an electronic device. The update system comprises a memory layout preprocessor used in formulating a memory layout of the firmware, a user interface to provide input data from a user, a binary image creator used to generate a firmware initialization binary pattern, a generator to provide a desirable software update package for incorporation into a device memory, a software repository for storing binary image patterns and software modules and objects, an external computer system for storing memory layout specifications, an update agent used for processing the software update package generated by the generator, and an electronic device containing the device memory in which the firmware to be updated is resident.

A method is provided for effectively updating a software and/or firmware in an electronic device. In one embodiment, the version of software resident in a device's memory and the location and size of unused free memory is determined by initializing the device's memory with one or more pre-determined binary patterns. In one embodiment, buffer spaces are inserted between software modules in a device's firmware to allow for expansion of a particular software module by way of a future update. In one embodiment, one or more software modules (or objects) are inserted into pre-configured code expansion slots in device's firmware. The memory space that remains after all objects are inserted into a slot provides buffer space to allow for future updates to these objects.

These and other advantages, aspects, and novel features of the present invention, as well as details of illustrated embodiments, thereof, will be more fully understood from the following description and drawings.

BRIEF DESCRIPTION OF THE DRAWINGS

FIG. 4A is a relational block diagram illustrating an arrangement of software modules and remaining free memory space in a device memory in accordance with an embodiment of the invention.

FIG. 4B is a relational block diagram illustrating an arrangement of software modules, a block of random free memory space between two software modules, and remaining free memory space in a device memory in accordance with an embodiment of the invention.

FIG. 5A is a relational block diagram illustrating a number of uniformly sized free memory spaces interspersed between a number of software modules in accordance with an embodiment of the invention.

FIG. 5B is a relational block diagram illustrating a number of software modules and corresponding free memory spaces in which the size of a free memory space is proportional to the size of its corresponding software module in accordance with an embodiment of the invention.

FIG. 6A illustrates an exemplary input that is processed by a layout processor to yield a scatter load file output in accordance with an embodiment of the invention.

FIG. 6B illustrates an exemplary scatter load output from a layout processor in accordance with an embodiment of the invention.

DETAILED DESCRIPTION OF THE INVENTION

Figure 1:
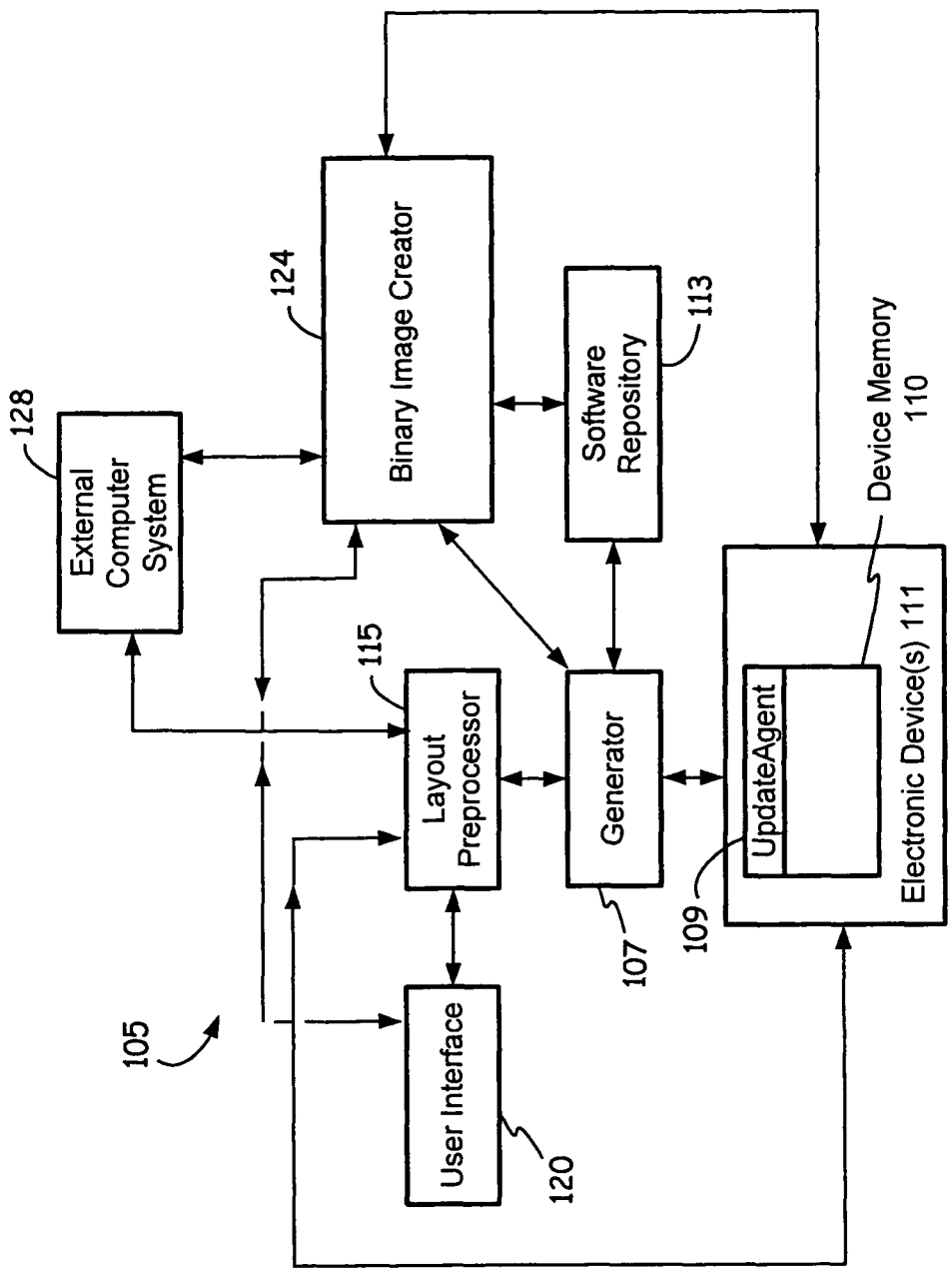
FIG. 1 is a block diagram of a memory initialization and software update system for an electronic device in accordance with an embodiment of the invention.

FIG. 1 is a block diagram of a memory initialization and software update system in accordance with an embodiment of the invention. The memory initialization and software update system 105 comprises a generator 107 that generates a software update package for an electronic device 111 with device memory 110 by way of a memory layout specification, a software repository 113, an update agent 109 residing within the electronic device 111 that can apply the update package onto the electronic device 111 to upgrade any existing software resident in the device memory 110 of the electronic device 111, a layout preprocessor 115 that facilitates the introduction of unused memory space for software packages, a user interface 120 to allow input of parameters related to the memory layout specification, and a binary image creator 124 that generates binary image packages for initializing of the device memory 110 of the electronic device 111. The software repository 113 may store software packages generated by the generator 107, as well as binary image packages generated by the binary image creator 124. The software packages generated by the generator 107 comprise software required by the device memory 110 of the electronic device 111 to function properly. The software packages may comprise a number of software modules. Typically, the software (or firmware) is executed upon power up of the electronic device 111 in preparation for normal operation by the user. An external computer system 128 may be used as a source to provide a memory layout specification to the layout preprocessor 115. The terms software package, update package, and software update package used herein includes instructional code that may be processed by the update agent 109 in the creation of updated software in the electronic device 111. Herein, the concept of initializing a device memory 110 by a binary pattern occurs by way of creating a binary data image that is subsequently loaded onto the device memory 110 of the electronic device 111.

The electronic device 111 comprises any electronic device such as an exemplary mobile handset, personal digital assistant (PDA), computer, pager, interactive digital appliance, or the like. Within the electronic device 111 resides a device memory 110 capable of storing and running firmware or software for properly booting up and subsequently operating the electronic device 111. Exemplary device memory 110 includes flash memory, random operating memory (ROM), electrically programmable ROM, or the like.

The software repository 113 may comprise one or more computer storage devices such as a hard drive, optical drive, CD-ROM drive, DVD drive, tape drive, or other like device. As illustrated in FIG. 1, the software repository 113 interfaces with the binary image creator 124 and the generator 107.

The update agent 109 comprises hardware and/or software configured to provide processing of a software package provided to it by the generator 107. The update agent 109 may reside within the electronic device 111.

The external computer system 128 comprises one or more computers in a network providing one or more storage devices with storable media. The external computer system 128 interfaces with the binary image creator 124 or layout preprocessor 115.

The user interface comprises a keyboard or other input device, as well as a monitor or visual communications device capable of permitting a user to input commands and data into the software update system 105.

The binary image creator 124 configures a binary image by way of a memory layout specification for a given device memory 110. The binary image creator 124 may comprise a combination of hardware and software capable of generating binary image patterns. It is contemplated the memory layout specification may be obtained from the device memory 110 or from a storage device within an external computer system 128 or by manual input by way of a user interface 120 connected to the layout preprocessor 115. The memory layout specification provides information regarding the characteristics of the device memory 110 in the electronic device 111. In addition, the size of the unused memory space to be deployed and the location or position of these spaces comprise the memory layout specification.

The layout preprocessor 115 comprises hardware and/or software capable of utilizing a memory layout specification. It generates a layout configuration file often called a scatter load file (to be discussed later) that maps the memory locations of software modules loaded into the device memory 110. The configuration file is then provided to the generator 107 in which a suitable software update package is generated for the electronic device 111.

The generator 107 comprises hardware and software capable of generating a software package for direct incorporation into a device memory image or may store the software package in the software repository 113 for subsequent retrieval and use by one or a plurality of software update systems 105. It is contemplated the software package comprises either a new software package that is loaded in a new electronic device 111 at the time of manufacture or a software update package that is installed as a revision to an existing software package in an electronic device 111. Incorporation of the software package into the device memory 110 is by way of an update agent 109 resident within the electronic device 111. The generator 107 typically creates a software package by comparing an existing software image resident in the device memory 110 of the electronic device 111 to a newer version of the same software that may be stored in the software repository 113 or the external computer system 128. The generator 107 computes differences in the software images and creates an appropriate software package. The update agent 109 in the device 111 is capable of applying the update package onto the electronic device 111 by processing and executing the instructions provided with the software package.

The generator 107 determines that an electronic device 111 requires a software update by way of a binary image previously stored onto the device memory 110 of the electronic device 111 by way of the binary image creator 124. The binary image package may be generated by the binary image creator 124 for use by the generator 107 in the incorporation of new or updated software into the device 111. The binary image package generated by the binary image creator 124 and the software package generated by the generator 107 may be installed into a plurality of electronic devices that are similar or identical in design and function to the electronic device 111. The binary image package may be directly transmitted to the electronic device 111 by the binary image creator 124 for installation into the device memory 110. It is contemplated the update agent 109 may facilitate installation of the binary image. Different binary image packages comprising distinct binary patterns may be created. One or more of these patterns may be installed in a plurality of one or more types of devices as necessary. When interfaced with the generator 107, the different versions of installed binary images in the plurality of electronic devices may be easily analyzed or compared by the generator 107 in order to determine differences in software version. Further, the implementation of these unique binary images or patterns may allow the generator 107 to differentiate unused memory space from software resident in the device memory 111 and calculate any available free or unused memory space. It is contemplated the generator 107 may interface with an electronic device 111 by way of wireless or wireline data communications.

By populating the unused portion of memory with binary patterns characterized by a known and consistent value, a version of software that exists in a particular electronic device 111 may be identified. Further, a comparison of different versions of software resident in a device memory 110 should yield a specific difference image. For example, a generator 107 that is configured to process a difference image may subtract a version n image from a version n+m image to generate a resulting difference image, necessitating that a specific software update package be generated and incorporated into all electronic devices using a version n image.

In general, the binary image creator 124 creates a binary memory image for initialization of the device memory 110. A finalized binary image may be loaded into the device memory 110 by the binary image creator 124 before any software package is loaded onto the device memory 110 by the generator 107. In other instances, software modules may be incorporated into the binary memory image prior to loading. In one embodiment, the binary image creator 124 is responsible for assembling a finalized memory image that is subsequently programmed or flashed into the device memory 110 of the electronic device 111, such as during manufacturing. Furthermore, it is contemplated that predetermined binary images may be stored within the software repository 113 for future use. Predetermined binary images may be comprised of a pattern of binary or hexadecimal characters that create a unique image. For example, the device memory 110 may be initialized with the value 0xFFFF throughout its entire memory. Other values or combination of values may be employed in other embodiments. In one embodiment, the memory of the device memory 110 is segmented into multiple memory sections where each memory section is selectively initialized with a different predetermined memory pattern.

It is contemplated that various software packages representing different versions of software update packages may be saved in the software repository 113 by the generator 107 or loaded directly onto device memory 110 of one or more electronic devices 111. In one embodiment it is contemplated a software package may be incorporated into a binary image and then saved into the software repository 113 for future use by the generator 107. In one embodiment of the present invention, the values of the binary image pattern are consistent across electronic devices 111 with the same software or firmware version. The update agent 109 may serve to facilitate the incorporation of the binary image or software modules into the device memory 110.

In general, the binary image creator 124 may be used to initialize device memory 110 in different types of devices so that subsequent processing by the generator 107 may be accomplished. Such processing includes determining different versions of the same software or determining unused memory locations in a device memory 110.

Figure 2:
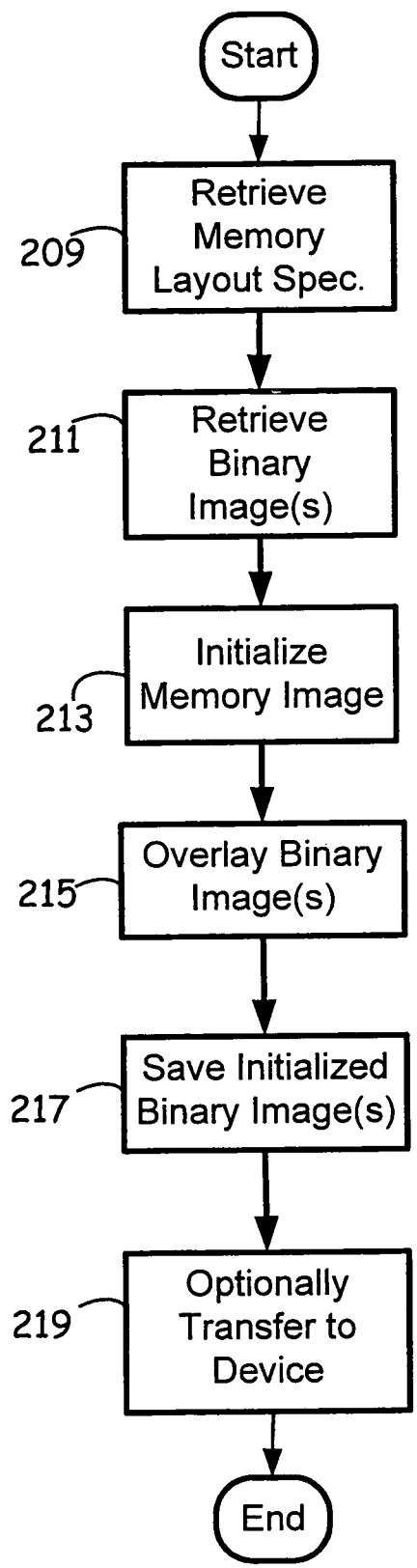
FIG. 2 is an operational flow diagram illustrating a method of initializing and updating software loaded in a device memory of an electronic device in accordance with an embodiment of the invention.

FIG. 2 is a process flow diagram illustrating an exemplary process of memory image initialization of device memory and subsequent loading of software packages, in accordance with an embodiment of the invention. At step 209, a binary image creator 124, such as that illustrated in FIG. 1, selectively retrieves a memory layout specification from an external computer system 128, from a device memory 110, or from user input through a user interface 120. Information such as number of memory, type of memory, and size of memory is provided by the memory layout specification for use by the binary image creator 124. Next, at step 211, an appropriate binary image pattern configured for use with the memory layout specification is selected and retrieved from a binary image repository 113. Then, at a next block 213, the binary image creator 124 may create one or more images for initializing one or more device memories. The binary image creator 124 accomplishes this by writing or loading the one or more images it creates into one or more electronic devices 111. In other instances, the binary image creator 124 may configure a binary image comprising a pattern suitable for loading into a device memory for eventual or future use. This binary image may be stored in the software repository 113. Subsequently, at step 215, a software repository 107 provides an image of one or more software packages or software module(s) to the electronic device 111 for incorporation into the device memory 110. Software associated with functionality of the update agent 109 may be incorporated into memory by way of modification of the binary image. The resulting image in memory is such that unused or free memory can be identified by means of the initialized pattern(s). In addition, a particular binary pattern may be used in the initialization process to correspond with a particular software package version, type of software, or types of software modules loaded into the device memory 110. In this fashion, a particular software version resident in device memory 110 may be identified. Later, at steps 217 and 219, the initialized binary images with written software module(s) are saved in a software repository 113 or loaded into one or more device memories 110 of electronic devices 111.

Figure 3A:
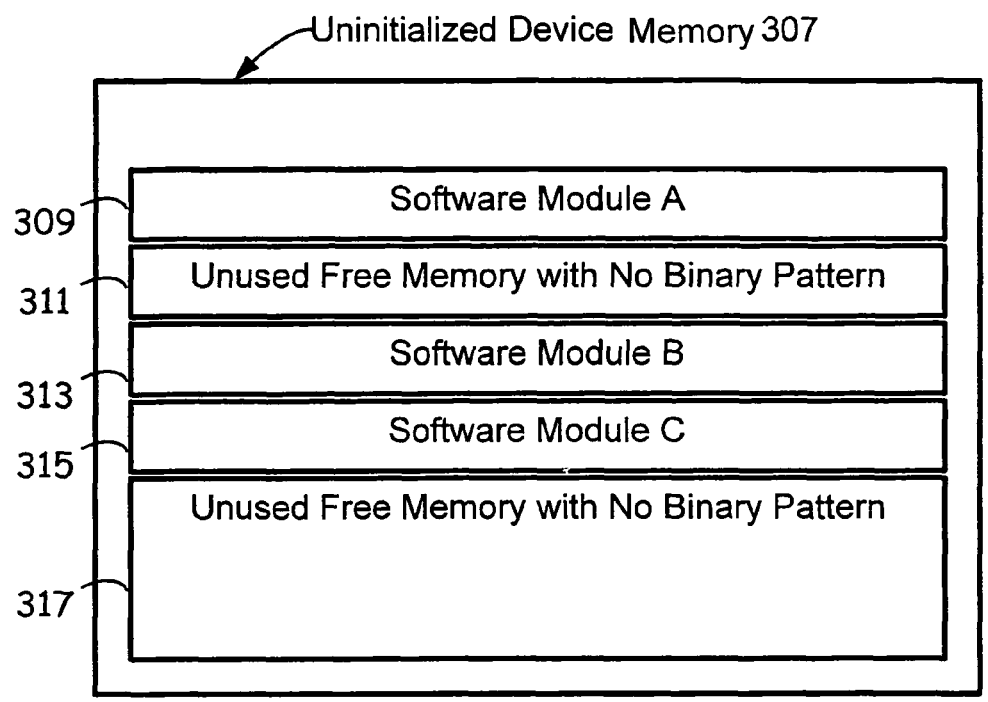
FIG. 3A is a diagram illustrating a memory image comprising a number of software modules and un-initialized free memory space configured for loading into an electronic device in accordance with an embodiment of the invention.

FIG. 3A is a block diagram illustrating exemplary software modules and unused free memory space resident in an un-initialized device memory 307 of an electronic device, in accordance with an embodiment of the invention. Exemplary software modules A 309, B 313 and C 315 are distributed in the un-initialized memory 307 with some amount of free memory available 311, 317, although the available free memory 311, 317 may be indistinguishable from memory occupied by the software modules A 309, B 313, and C 315, because the unused free memory 311, 317 is characterized by a random bit pattern. In addition, a comparison of images resident in un-initialized memories of two similar electronic devices by the generator 107 is likely to produce inconsistent difference images. As illustrated in FIG. 3A, unused free memory 317 is typically located at the end of the un-initialized memory 307 and an occasional unused free memory block 311 may occur at random. Software modules A 309, B 313, and C 315 may have adjacent free memory blocks introduced intentionally or by random chance.

Figure 3B:
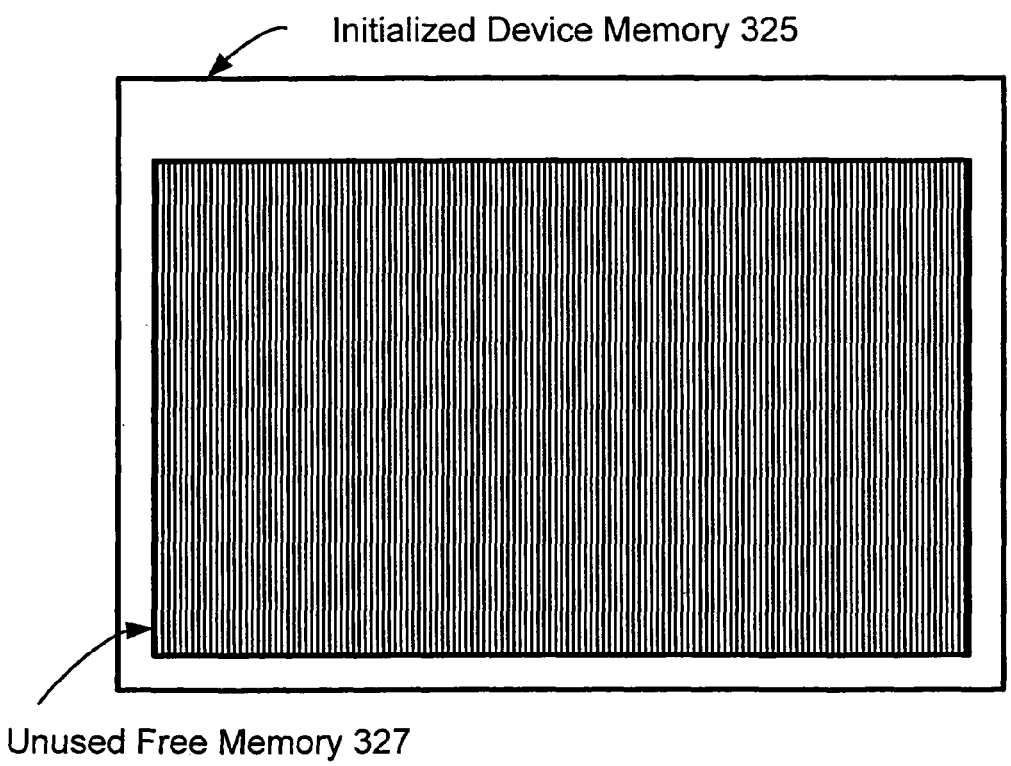
FIG. 3B is a diagram illustrating a device memory initialized with a pre-determined pattern in accordance with an embodiment of the invention.

FIG. 3B is a block diagram illustrating an exemplary memory image of an initialized device memory 325, in accordance with an embodiment of the invention. Here, the entire memory is initialized with a unique pre-determined pattern. After initialization, the unused memory 327 spans the entire device memory. Because the pattern is known and deterministic, any unused or free memory space within a device memory is easily detected after a software package is loaded into the initialized device memory 325. In addition, the pre-determined pattern provides a recognizable image that may be used as a tag or identifier to identify a particular software version. When comparing a device memory of an earlier software version with a current release version, the exemplary generator 107 shown in FIG. 1 may generate a unique difference image and subsequently correlate this with a corresponding software update package. In one embodiment of initializing a memory, a specific pattern may be employed for an entire device memory. In another embodiment, the device memory is segmented into multiple segments, and different patterns are stored into the different segments of the memory during initialization. In the latter method, it is contemplated the different patterns provide additional means to identify an image.

Figure 3C:
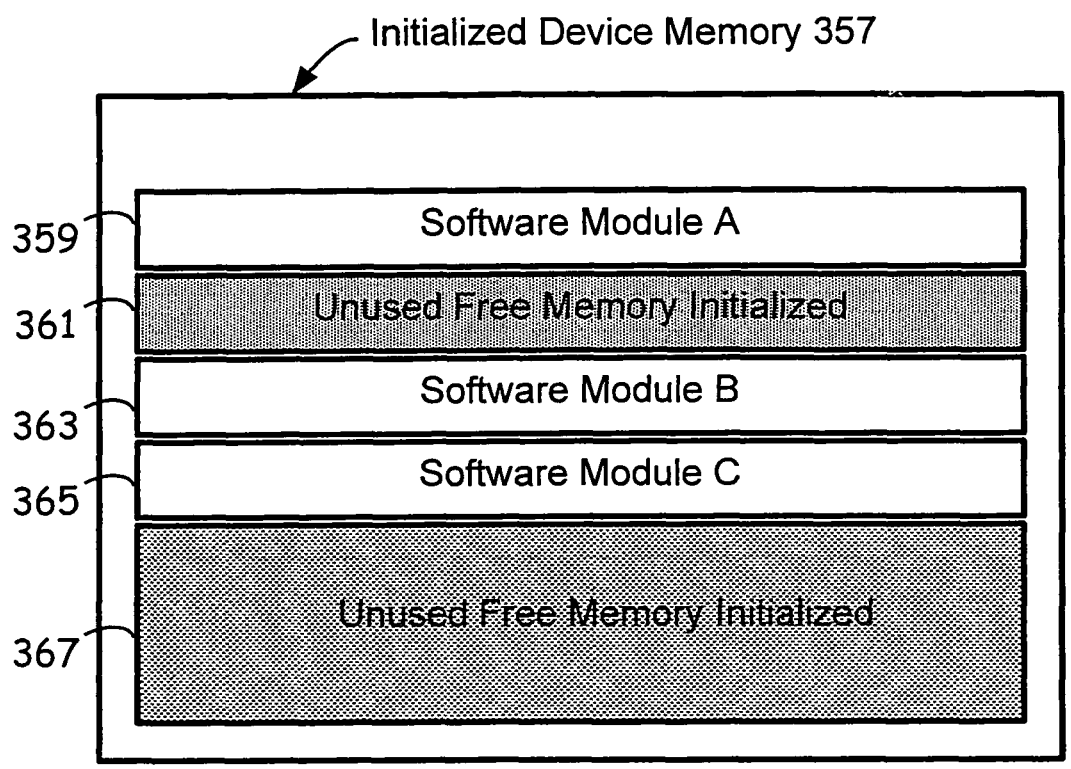
FIG. 3C is a diagram illustrating a memory image comprising a number of software modules and initialized free memory space configured for loading into an electronic device in accordance with an embodiment of the invention.

FIG. 3C is a block diagram of an exemplary embodiment in accordance with the present invention, illustrating software modules A 359, B 363, and C 365 written into initialized device memory 357. The software modules A 359, B 363 and C 365 are written onto memory that is initialized with a specific pattern making it possible to distinguish the available free memory 361 367 from memory currently occupied by software modules 359 363 365. In addition, the pre-determined pattern provides an image that may be used as a tag or identifier to identify a particular software version.

The electronic device 111 may determine a priority of use based upon the specific bit pattern employed in the unused free space. The electronic device 111 may consume portions of unused memory accordingly. For example, one or more portions of unused memory may be coded with a specific binary pattern indicating a priority or preference of use. If the electronic device 111 eliminates any software module, or if any software module relinquishes currently used memory, the released memory space can be selectively re-initialized with one or more specific patterns designating its preference for future use.

In one embodiment, the device memory 110 comprises a FLASH type of memory initialized entirely to a specific pattern comprising hexadecimal values of 0xFFFF. In another embodiment, the device memory 110 comprises four FLASH segments (FLASH1, FLASH2, FLASH3, FLASH4) specified to be 0x20000 in size, plus a RAM segment of size 0x40000. In one embodiment, the FLASH segments and the RAM segment are all initialized to the same pattern. In one embodiment, the FLASH and RAM segments are initialized using one or more patterns.

The layout preprocessor 115 determines available free space in the device memory 110 by way of a memory layout specification provided by the external computer system 128 or one or more electronic devices 111. The preprocessor 115 distributes available free space among individual software modules so as to provide effective and efficient updating of one or more software modules resident in the device memory 110. If the device 111 has extra free space that is currently not being used, the extra free space can be distributed among the available software modules and the software modules can be spread out in memory so as to provide free space segments, called reserved buffer spaces, juxtaposed to the software modules, providing a mechanism to constrain any update related changes to an individual software module and any dedicated free space around it.

In one embodiment of the present invention, one or more memory layout specifications are contained in the layout preprocessor 115 and may be selectively employed by the layout preprocessor 115 to distribute available free space among software modules in a device memory 110 by creating one or more reserved buffer spaces adjacent to each of the software modules. In another embodiment, a memory layout specification is retrieved by the layout preprocessor 115 from an external system 128, such as was described in FIG. 1.

In one embodiment, the memory layout specification specifies the layout of one or more sections of memory on the device, wherein the memory is comprised of one or more sections of FLASH memory and RAM memory. The origin and length of each section of FLASH or RAM is also specified along with assignments of one or more software modules to individual memory sections. The mapping of specific groups of code within a software module loaded onto the various sections of the memory (FLASH RAM) of the device are also specified. The layout preprocessor 115 incorporates the information contained in the memory layout specification in creating the reserved buffer spaces.

In one embodiment, the layout preprocessor 115 reorganizes and locates software modules on the electronic device 111 by computing the available free space and distributing this free space equally among the various software modules as reserved buffer spaces. In general, the layout preprocessor 115 is used as a pre-processing tool in configuring device memory images for different types of electronic devices 111 so that subsequent processing of one or more software modules by the generator 107 is easily performed with minimal change to unmodified software in the device memory 110. The layout preprocessor 115 may insert free spaces into one or more selected software modules in memory as a means to effectively localize changes to software that require additional free space.

FIG. 4A is a block diagram of an exemplary arrangement of software modules in a device memory 405 wherein the software modules A, B, C and D 407, 409, 411, 413 are positioned adjacent to each other without any free memory space separating the modules, according to an embodiment of the invention. Beyond the last module 413 is an unused or free memory segment 415 representing the remainder of unused memory. The software modules A 407, B 409, C 411, and D 413 may or may not be related to each other. Being adjacent to each other without any free memory between may cause a reorganization of links to addresses and references in other modules in order to modify or upgrade any one module. For example, if a new version of software module A 407 is loaded to replace the existing software module A 407, then replacing the existing version with the new version may require more or less memory space than what is currently utilized. Should additional memory space be required, a relocation or shifting of some or all modules B 409, C 411, and D 413 may occur. Relocation of software modules often necessitates changing the addresses of software jumps and references to addresses. Thus, an avalanche or overflow effect may occur in which an update to software module. A 407 results in changes to successive modules B 409, C 411, and D 413. Updates or revision to the last software module 413 may not produce an avalanche or overflow effect since it is adjacent to the free memory space 415 at the end of memory.

FIG. 4B is a block diagram of another exemplary layout of software modules in a memory displaying software modules that are adjacent to each other without free memory between them, according to an embodiment of the invention. As shown, a free memory segment 435 is characteristically located at the end of the memory block 425, and an occasional free memory block 437 may occur at random. It is contemplated the occasional free memory block 437 provides a small free memory space. Specifically, software modules A 427, B 429 and C 431 are adjacent to each other and modules A 427, B 429 do not have any adjacent free memory blocks while software module C 431 has a free memory block 437 adjacent to it, introduced not intentionally, but by random chance.

Such a memory layout may cause an avalanche or overflow effect described above for FIG. 4A, in which changes to any software module due to version upgrades are likely to cause relocation of one or more software modules downstream in the device memory 110. Relocation and shifting of memory may occur despite the occurrence of random free memory blocks 437 because they might not be large enough to accommodate the size requirements of software upgrades due to version changes, patches, or bug fixes.

FIG. 5A is a block diagram of an exemplary layout of software modules created by the layout processor 115 for a device memory 110 wherein uniform sized reserved buffer spaces are placed between the installed software modules A 507, B 509, C 511, and D 513, in accordance with an embodiment of the invention. By introducing reserved buffer spaces 517, 519, 521 and 533 adjacent to software modules A 507, B 509, C 511, and D 513, respectively, the layout processor 115 creates a layout for the software modules that accommodates changes to individual software modules without shifting other installed software modules. In fact, the size of each of the reserved buffer spaces may be adjusted so as to make relocation or shifting of other software modules unnecessary.

In one embodiment, the reserved buffer spaces 517, 519, 521 and 533 are configured to be the same size. In another embodiment, the reserved buffer spaces 517, 519, 521 and 533 vary based on the characteristics of the individual software modules A 507, B 509, C 511 and D 513.

FIG. 5B is a block diagram of an exemplary layout of software modules created by the generator 107 for a device memory 110 wherein non-uniform sized reserved buffer spaces 517, 519, 521 and 533 are positioned between the installed software modules so as to minimize the shifting effects associated with upgrading one or more software modules, according to an embodiment of the invention. Here, the size of each reserved buffer space is proportional to the size of the software module(s) it is associated with. For example, the size of reserved buffer space 517 adjacent to the software module A 507 is selected based upon and in proportion to the size of the corresponding software module A 507. Thus, reserved buffer space 519 is smaller than reserved buffer space 517 because the software module B 509 is smaller than the software module A 507.

The methods described in FIGS. 5A and 5B illustrate an embodiment where reserved buffer spaces are placed between all software modules. Hence, each software module has its own dedicated free memory space.

FIG. 6A illustrates an exemplary input instructional software code that is processed by the layout preprocessor 115 to generate a memory mapping or scatter load file (as will be discussed later) that incorporates reserved buffer spaces between software modules in the device, in accordance with an embodiment of the invention. It depicts a memory that comprises a FLASH segment of size 0x70000 and a RAM segment of size 0x40000. The software code incorporates information provided by a memory layout specification.

FIG. 6B is an exemplary output of a scatter load file that is created by the layout preprocessor 115 that incorporates reserved buffer spaces between software modules in a device, according to an embodiment of the invention. It depicts a memory that comprises four FLASH segments, with a total size 0x70000, with one FLASH segment (FLASH1) specified to be 0x1000 in length and three other FLASH segments (FLASH1, FLASH1, FLASH1) specified to be 0x20000 in size, in addition to a RAM segment of size 0x40000. For each of the FLASH segments, a mapping of individual software modules is also depicted by way of a data structure termed SECTIONS.

When a new software module update is generated by the generator 107 (as illustrated in FIG. 1) for an electronic device 111, additional memory space may be required beyond the space occupied by the existing software module. One method to provide reserved buffer spaces within a device memory of an electronic device is by allocating slots within memory in which one or more software modules or object files may be loaded. These slots may be filled with other object files as new or updated code is incorporated to the electronic device. It is contemplated the slot sizes would be designed to accommodate any anticipated expansion due to expected software updates. Using a design technique described below, the expansion slots are not completely filled by successive updates. Hence, successive slots in memory are not be affected by overflow from a preceding slot obviating any shifting or relocation of software code.

An embodiment of the layout preprocessor 115, termed a code expansion slot tool (CEST), may be used to implement the slot allocation technique described in the preceding paragraph. In this embodiment, a scatter load file is employed to configure memory layout information of software modules stored within a device memory 110. In this embodiment, the scatter load files provide configuration information concerning the assignment of software modules (or objects) to slots and the amount of memory space assigned per slot. Any reserved buffer spaces are determined for each slot based on remaining space after all objects have been assigned to a particular slot. It is contemplated the CEST comprises a software application with graphical user interface that operates on the scatter load file and is executed at the layout preprocessor 115 (illustrated in FIG. 1). The scatter load file is ultimately used by the generator 107 in creating a software package for incorporation into the device memory 110.

The user of the CEST may specify the number of slots a memory image should be divided into by way of the user interface 120. The user of the CEST may organize the memory slots within the image according to a likelihood of change of the objects within a slot. In one embodiment, the objects that are likely to change may be placed within a slot closest to the end of memory. In one embodiment, the objects that are likely to change may be placed within a slot of large memory size. These scatter load files may be stored on a per project basis in the external computer system 128 or in the layout preprocessor 115. It is contemplated the CEST may be used as a tool to write or formulate an appropriate scatter load file. If the CEST determines that the user does not have enough memory (i.e., ROM) to partition the entire software into the number of slots required, the CEST may be configured to provide an error message and a diagnostic report.

Figure 7A:
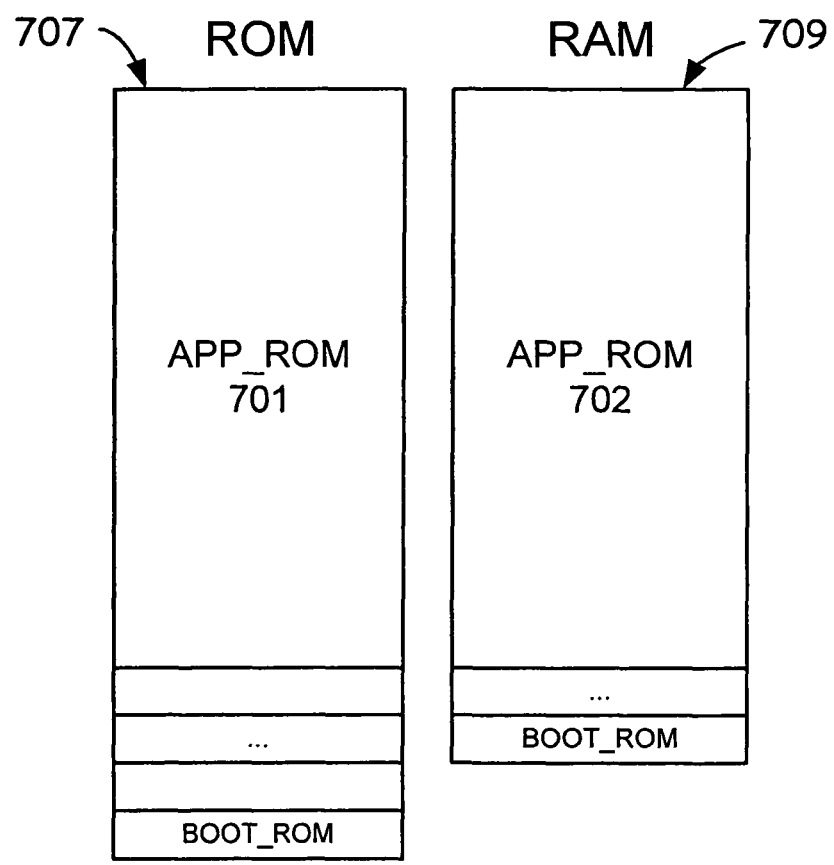
FIG. 7A illustrates the transfer of software from ROM to RAM in firmware without free buffer spaces.

FIG. 7A is a perspective block diagram that depicts exemplary ROM 707 and RAM 709 footprints in a typical mobile handset without the use of the methods described in connection with this invention. During operation, software code from ROM 707 (such as in a FLASH memory) is copied to a designated address location in RAM 709 for execution. In one embodiment, the addresses and references of the objects in ROM correspond to their actual designated locations in RAM during execution. As illustrated, the application software 701 in ROM is copied to RAM as identical application software 702.

Figure 7B:
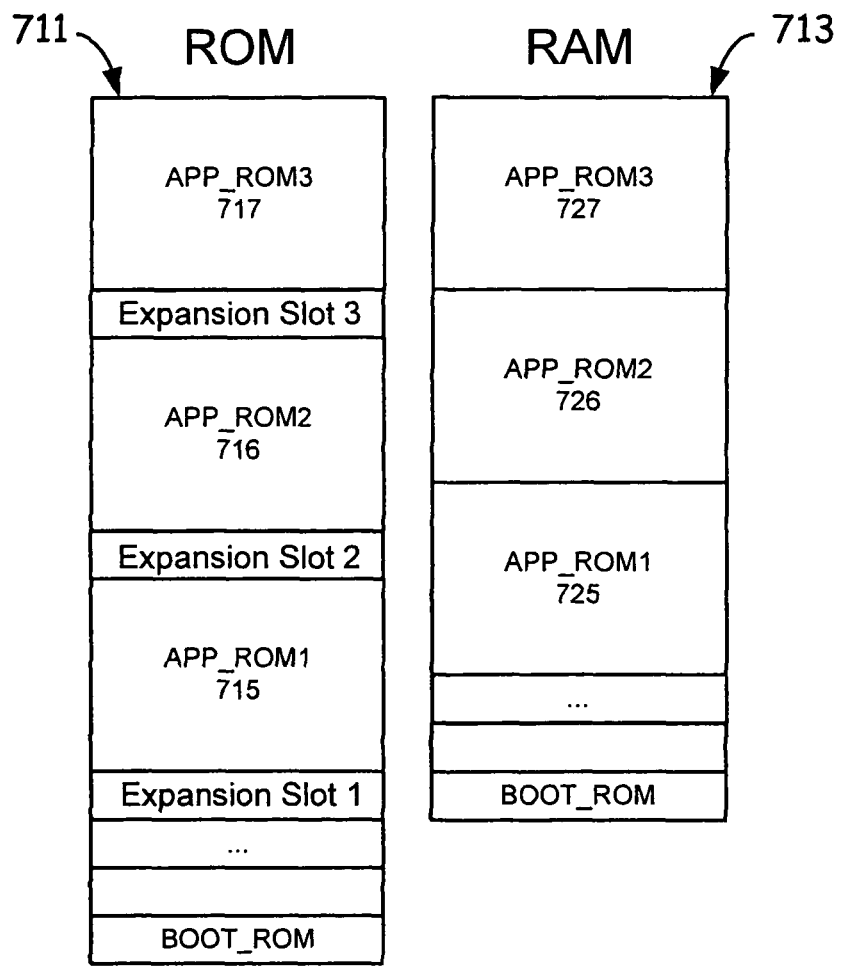
FIG. 7B illustrates the transfer of software from ROM to RAM in firmware with free buffer spaces in accordance with an embodiment of the invention.

In contrast, FIG. 7B is a perspective block diagram that depicts exemplary ROM 711 and RAM 713 footprints in a mobile handset wherein code expansion slots are employed to allow for growth in software code due to updates, in accordance with an embodiment of the invention. The application software 715, 716, 717 in ROM is identically transferred to RAM as application software 725, 726, 727. As a consequence, the mobile handset operates identically to that described in FIG. 7A.

Figure 8:
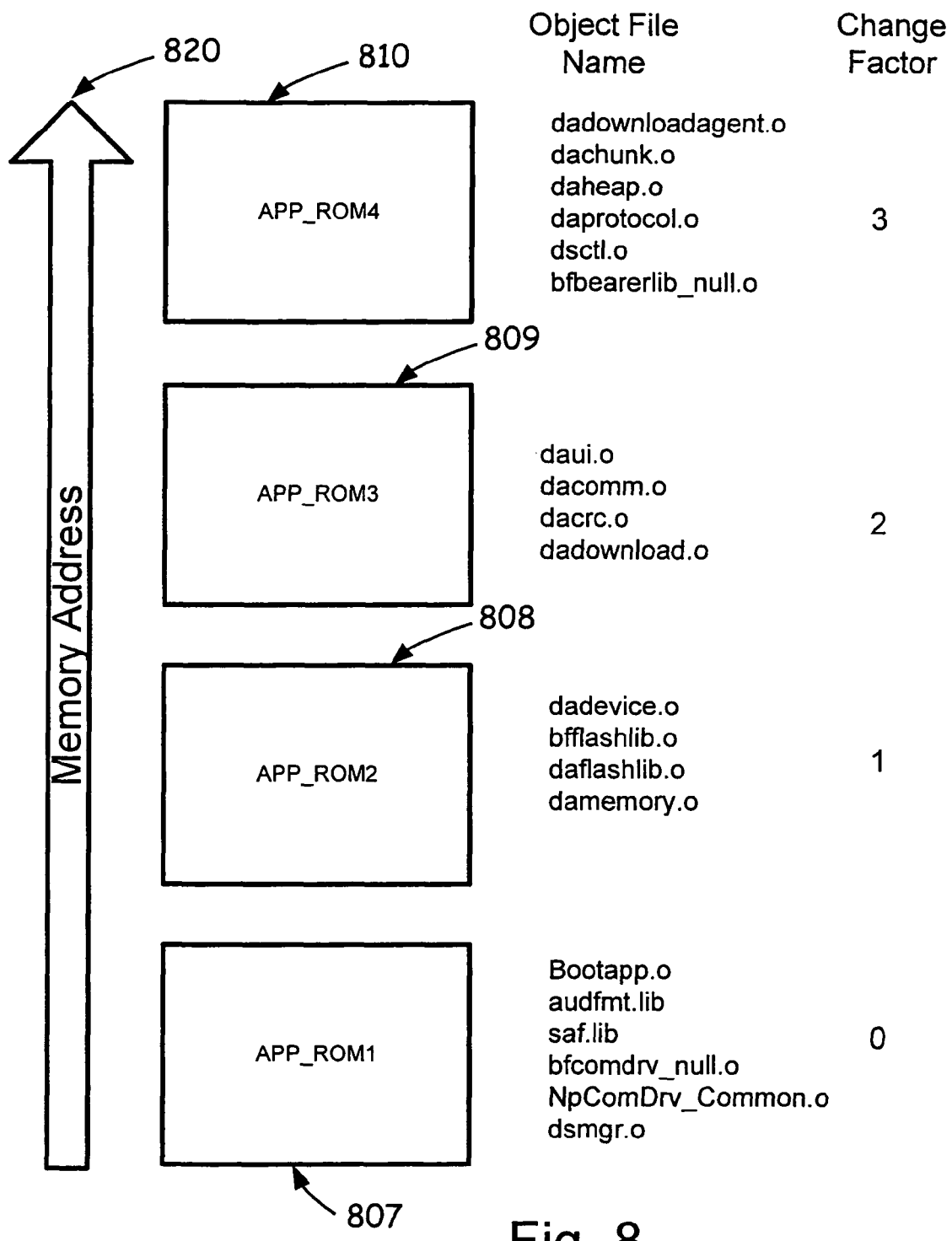
FIG. 8 illustrates groupings of object files based on change factors and their relationship to memory addresses in a device memory in accordance with an embodiment of the invention in accordance with an embodiment of the invention.

FIG. 8 is a perspective block diagram that depicts an exemplary grouping of software objects that is grouped based on their probability of change, according to an embodiment of the invention. The probability of change is termed a change factor. As illustrated, objects having like probability of change are grouped into the same change factor. In this exemplary diagram, the change factor varies from a value of 0 to a value of 3. As illustrated, the objects having the greatest likelihood of change are placed towards the end of memory (at highest address locations) and are assigned a change factor of 3. As shown by the directional arrow 820, the change factors having a higher probability of change are stored in higher address memory locations in ROM. In this exemplary diagram, ROM is divided into four slots labeled APP_ROM1 807, APP_ROM2 808, APP_ROM3 809, and APP_ROM4 810 to accommodate object files with varying change characteristics. Object files Bootapp.o, audfmt.lib, saf.lib, bfcomdrv_null.o, NpComDrv_Common.o, and dsmgr.o are associated with a zero change factor and are characterized by a low probability of change. As a consequence, they are stored in a low address memory range such as APP_ROM1. On the other hand, object files such as dadownloadagent.o, dachunk.o, daheap.o, daprotocol.o, dsctl.o, and bfbearerlib_null.o are stored in APP_ROM4 810 because these files are considered to have a high probability of change.

Typically, a firmware image may comprise thousands of objects to allow for a fully functional device. When a firmware comprises many thousands of object files, it is contemplated the update methods employed by the embodiments described is of greater significance because of the avalanche or overflow effect described. When such methods are not employed, an update may necessitate using an update package of increased size.

As the amount of available space in memory is limited, it is useful to allocate memory space as effectively as possible. Updates are often necessitated by major bug fixes, performance requirement changes, or new functionalities. Often a user's practical experience is employed to refine the amount of reserved buffer spaces allocated per block of device memory to accommodate for such updates. If experience dictates that a particular object is not going to change during a device's lifetime, it may be desirable to assign it to a slot containing little unused space unless extra space is plentiful. In one embodiment, a weighting factor may be used to multiply an average buffer slot size in the calculation of the amount of reserved buffer space or code expansion space required. It is contemplated that by experimentation and experience, a user may determine the average buffer slot size required.

The selection criteria for grouping objects are also addressed. For example, all objects that were predicted not to change may be grouped together into a common slot at the beginning of memory. In addition, if two or more objects share similar functionality, they may be grouped together. In this instance, it is contemplated the benefit is easier organization and implementation of a particular design.

In one embodiment, a firmware image intended for release is built by compiling code and organizing the compiled objects into an image. During the build process, a linker generates what may be called a map file. A map file contains the results of the link including the final sizes of objects and their placement in the firmware image. From the map file, the names and sizes of all objects are defined and this information may be subsequently assigned into a device memory's slots. In some cases, objects can be grouped and in other cases single objects could be placed in dedicated slots. As an example, an object A is found in the map file to occupy 24 KB. Because the probability of change for this object is considered high, it is estimated the object might grow to 32 KB in the future. Based on this value, a slot size of 32 KB may be specified in its corresponding scatter load file. With the slot sizes preliminarily defined by a map file, a scatter load file can be used to re-specify each slot or software module size and its associated object files. In one embodiment, a linker is used to place compiled source code into software (firmware). The linker arranges all the compiled objects into a firmware image of which the order of objects in firmware are specified by the scatter load file. This image is then copied into a flash memory of an electronic device. To implement an appropriate layout of memory, a scatter load file may be formatted as follows:

---
Scatter Load File (SLF) Format
---
section-name starting-address size
{
　　object file-list
}
--- and has the following definitions:

section-name—An arbitrary label that describes a section, which can be considered a slot.

starting address—Address that specifies where in the final firmware memory the section is placed.

size—The size given to that section.

object file-list—The list of objects to be placed in the section or slot

Figure 9:
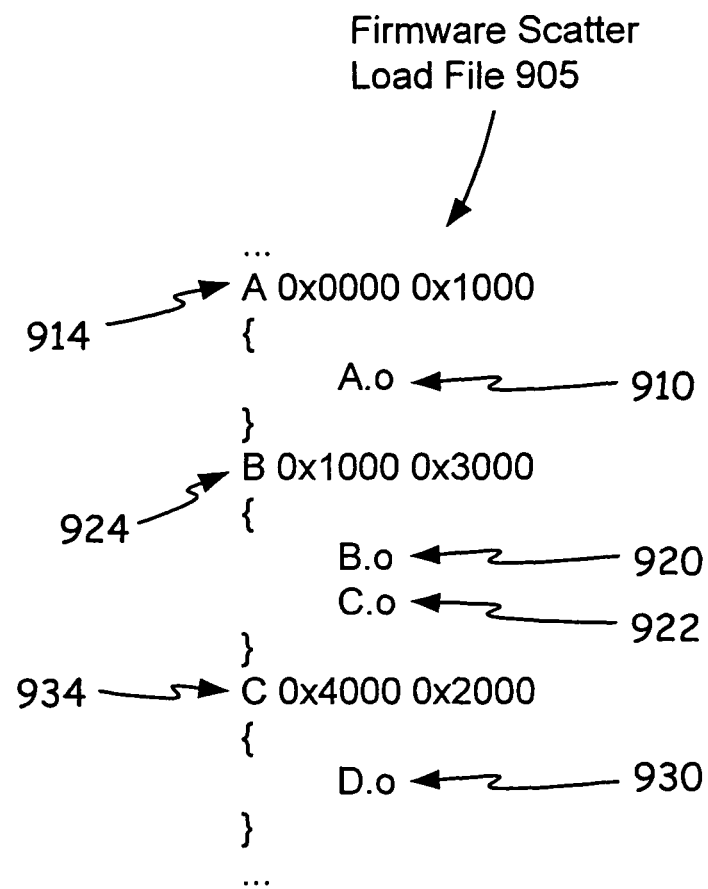
FIG. 9 provides an illustration of an exemplary scatter load file in accordance with an embodiment of the invention.
Figure 10:
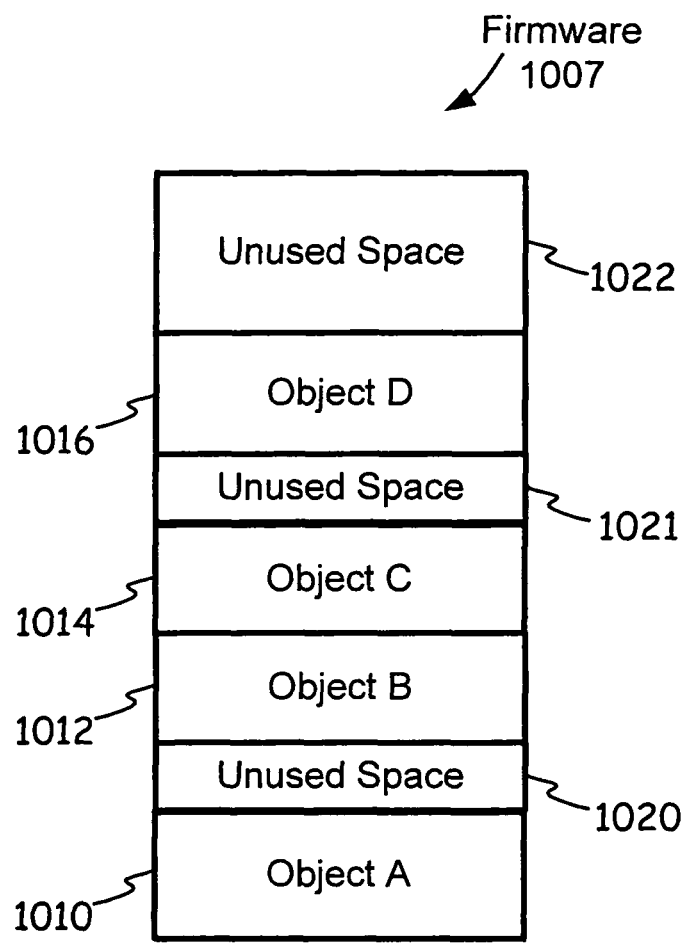
FIG. 10 is a block diagram illustrating objects and unused buffer spaces in firmware loaded on a device memory in accordance with an embodiment of the invention.

FIGS. 9 and 10 illustrate a set of instructions implementing an exemplary scatter load file 905 and its corresponding mapping of object files 1010 1012 1014 1016 and buffer spaces 1020, 1021, 1022 onto a firmware 1007, in accordance with embodiments of the invention. The scatter load file 905 specifies that an object A 910 is placed in section A 914, objects B 920 and C 922 are placed in section B 924, and an object D 930 is placed in section C 934. Section A 914 may accommodate up to 0x1000 bytes, while section B 924 up to 0x3000 bytes, and section C 934 up to 0x2000 bytes. In the case of section B 924, there are two objects of which the sizes of both objects B 920 and C 922 cannot exceed 0x3000 bytes. If the objects in any section exceed the section size, a linker error may be generated during the build of the firmware.

In one embodiment, a code expansion slot tool (CEST) of the layout preprocessor 115, shown in FIG. 1, may be configured to provide the following:

A per project configuration file that may comprise information such as:
　Number of memory blocks a device memory is divided into
　Change factor values for each memory block
　Scatter load file information such as filename and location.
　Memory size
　Starting and ending addresses in each block of device memory
　Amount and location of reserved buffer space or code expansion slot for each block of device memory
　Map filename and location
　The names of the object files and what blocks they belong to
Automated or manual creation of a scatter load file incorporating code expansion slots
A configuration file for the general tool use that will store the names and locations of each project
Ability to read Map files and determine the following:
　Name of each load and execution block
　Size of each load and execution block
　Name and size of each object file
A graphical user interface provided by the CEST
Provide the user with the ability to input starting and ending information of blocks within device memory
Provide the user the ability to associate one or more groups of object files with a change factor. It is contemplated an exemplary numeric scale for this factor will be as follows:
　0. No changes
　1. Infrequent Changes
　2. Moderate Changes
　3. Frequent Changes
Ability to save a user's personal settings into the project configuration file
Allocation algorithms for configuring memory blocks or slots within a device memory:
　Allocate object files to memory blocks or slots according to its associated change factor such that memory blocks (or slots) at the highest addresses in memory have the greatest available free space
　Allocate free space evenly among the device memory blocks
　Allocate no space for the first two address blocks or slots in device memory, but evenly split the unused free memory space among the remaining memory blocks
　Allocate space based on weighting factors correlated to probability of change and an average reserved buffer size
　It is contemplated other combination of uniform and non-uniform space allocation methodologies may exist and may be implemented Provide an errata log which comprises the following:
  Date in which error occurs
  Project name associated with error
  Error message
  Diagnostic information
Prompt the user concerning the allocation of single large blocks of device memory for a large software module such as an exemplary main application software module. It is contemplated the CEST may divide this block into a number of sub-blocks. The CEST may alert the user if a block is of a certain maximum size, in order to ensure that block sizes are not too large.
Upon segmentation of large blocks, files may be assigned to the newly segmented memory blocks based on change factor.
Ability of a user to manually map object files or other files with specific ROM blocks.

The code expansion slot method utilizing a scatter load file as embodied in the CEST may provide minimization of update package sizes for many version releases of a firmware image. Just as an initial release requires code change factor estimates and heuristics that are experimented with until a desired slot organization and characteristics are achieved, during any revision work, the slots should not be adjusted until all the changes are implemented and desired characteristics are determined and achieved.

Organizing object code within firmware generally involves evaluating each software object and identifying the objects that are most likely to require modifications or enhancements. This determination may be based on a manufacturer's development cycle, product road map, or other distinguishable metrics. The objects with a high probability of significant modification would then be placed at the top of the firmware image or highest memory address in firmware. If modifications are required after the device's commercial release that result in significant changes to these objects, displacement, relocation, or shifting of objects into other memory blocks or slots would most likely occur. Further, the addition of large updates may overwhelm the reserved memory in one or more slots. However, since these objects were placed at the top of the image, the avalanche effect is limited to the top area of flash, resulting in a smaller update package (used for updates) than would have been generated (by a generator 107) if these objects were located at the bottom of the image.

In summary, aspects of the present invention provide a number of embodiments of a system and method to effectively initialize and update firmware in an electronic device. In one embodiment, the version of software resident in a device's memory and the location and size of unused free memory are determined by initializing the device's memory with one or more pre-determined binary patterns. In one embodiment, buffer spaces are inserted between software modules in a device's firmware to allow for expansion of a particular software module by way of a future update. In one embodiment, one or more software modules (or objects) are inserted into pre-configured code expansion slots in device's firmware. The memory space that remains after all objects are inserted into a slot provides buffer space to allow for future updates to these objects.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for updating memory in an electronic device, the system comprising:
  at least one processor that, during operation, executes generator code for generating a software package from a plurality of code modules for the electronic device;
  layout preprocessor code executable by the at least one processor for parsing a memory layout specification and that receives at least one parameter that represents an estimated probability of future change of one or more code modules, to produce memory mapping information that assigns to each of the plurality of code modules space in one of a plurality of individual portions of the memory, based upon the memory layout specification;
  wherein execution of the layout preprocessor code determines an amount of unassigned space in the memory upon assignment of space in the memory to the plurality of code modules; and
  wherein execution of the generator code locates a corresponding fraction of the unassigned space in the memory in each of the individual portions of the memory, in accordance with the memory mapping information.

2. The system according to claim 1, wherein the electronic device comprises one of a mobile handset, a pager, and a personal digital assistant (PDA).

3. The system according to claim 1, wherein the plurality of code modules comprise code modules of a first version of code and corresponding code modules of a second version of code.

4. The system according to claim 1, wherein the memory of the electronic device comprises update agent code executable by a processor in the electronic device.

5. The system according to claim 4, wherein the software package comprises a set of instructions executable by the update agent code to transform code modules of a first version of code to code modules of a second version of code.

6. The system according to claim 1, wherein the at least one parameter comprises a corresponding probability of change for each of the individual portions of the memory.

7. The system according to claim 1, wherein the fraction of the unassigned space in the memory assigned to a corresponding one of the individual portions of the memory is a proportion of a total size of the code modules assigned to the corresponding one of the individual portions of the memory to a total memory space of the code modules that have been assigned space in the memory.

8. The system according to claim 1, wherein the unassigned space in memory is set to a bit pattern selected to permit identification of the unassigned space by examination of the memory.

9. The system according to claim 8, wherein the bit pattern comprises one or more contiguous occurrences of a sequence of one or more data values.

10. The system according to claim 8, wherein the bit pattern is selected to permit identification of a version of code.

11. The system according to claim 1, further comprising:
  communications code executable by the at least one processor that enables wireless transmission of the software package to the electronic device.

12. A method for updating memory in an electronic device, the method comprising:
  receiving at least one parameter that represents an estimated probability of future change of one or more code modules;

preprocessing a plurality of code modules for the electronic device, the preprocessing comprising determining an amount of unassigned space in the memory upon assignment of space in the memory to the plurality of code modules, and parsing a memory layout specification to produce memory mapping information that assigns to each of the plurality of code modules space in one of a plurality of individual portions of the memory, based upon the memory layout specification;

after the preprocessing, processing the plurality of code modules to generate a software package, wherein generating comprises locating a corresponding fraction of the unassigned memory space in the memory in each of the individual portions of the memory, in accordance with the memory mapping information; and storing the software package in a repository for later wireless transmission to the electronic device.

13. The method according to claim 12, wherein the electronic device comprises one of a mobile handset, a pager, and a personal digital assistant (PDA).

14. The method according to claim 12, wherein the plurality of code modules comprise code modules of a first version of code and corresponding code modules of a second version of code.

15. The method according to claim 12, wherein the memory of the electronic device comprises update agent code executable by a processor in the electronic device.

16. The method according to claim 15, wherein the software package comprises a set of instructions executable by the update agent code to transform code modules of the first version of code to code modules of the second version of code.

17. The method according to claim 12, wherein the at least one parameter comprises a corresponding probability of change for each of the individual portions of the memory.

18. The method according to claim 12, wherein the fraction of the unassigned space in the memory assigned to a corresponding one of the individual portions of the memory is a proportion of a total size of the code modules assigned to the corresponding one of the individual portions of the memory to a total memory space of the code modules that have been assigned space in the memory.

19. The method according to claim 12, wherein the unassigned space in memory is set to a bit pattern selected to permit identification of the unassigned space by examination of the memory.

20. The method according to claim 19, wherein the bit pattern comprises one or more contiguous occurrences of a sequence of one or more data values.

21. The method according to claim 19, wherein the bit pattern is selected to permit identification of a version of code.

* * * * *